US011902338B2

(12) United States Patent
Youn et al.

(10) Patent No.: US 11,902,338 B2
(45) Date of Patent: Feb. 13, 2024

(54) COMMUNICATION RELATED TO MULTI-ACCESS PDU SESSIONS

(71) Applicant: LG Electronics Inc., Seoul (KR)

(72) Inventors: Myungjune Youn, Seoul (KR);
Sungduck Chun, Seoul (KR);
Laeyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/798,981

(22) PCT Filed: Feb. 9, 2021

(86) PCT No.: PCT/KR2021/001679
§ 371 (c)(1),
(2) Date: Aug. 11, 2022

(87) PCT Pub. No.: WO2021/162393
PCT Pub. Date: Aug. 19, 2021

(65) Prior Publication Data
US 2023/0070882 A1 Mar. 9, 2023

(30) Foreign Application Priority Data
Feb. 13, 2020 (KR) .................. 10-2020-0017906

(51) Int. Cl.
*H04L 65/1073* (2022.01)
*H04L 65/1016* (2022.01)
*H04W 80/10* (2009.01)

(52) U.S. Cl.
CPC ...... *H04L 65/1073* (2013.01); *H04L 65/1016* (2013.01); *H04W 80/10* (2013.01)

(58) Field of Classification Search
CPC .......... H04L 65/1073; H04L 65/1016; H04W 80/10
(Continued)

(56) References Cited

U.S. PATENT DOCUMENTS 9,686,317 B2 * 6/2017 Pancorbo Marcos ........................
H04L 63/102
10,862,746 B2 * 12/2020 Buckley .............. H04M 17/103
(Continued)

FOREIGN PATENT DOCUMENTS

| KR | 20200008638 | 1/2020 |
|---|---|---|
| WO | WO 2018236145 | 12/2018 |

OTHER PUBLICATIONS

3GPP TS 23.503 V16.3.0 (Dec. 2019), "3rd Generation Partnership Project; Technical Specification Group Services and System Aspects; Policy and charging control framework for the 5G System (5GS); Stage 2 (Release 16)," Dec. 2019, 112 pages.
(Continued)

*Primary Examiner* — Melvin H Pollack
(74) *Attorney, Agent, or Firm* — Fish & Richardson P.C.

(57) ABSTRACT

One disclosure of the present specification provides a method by which a network node performs communication related to an MA PDU session. The method may comprise the steps of: receiving, from a UE, a SIP registration message including MA PDU session information; receiving, from another network node, a SIP message related to an IMS service for the MA PDU session; and transmitting, to a PCF node, information on whether the SIP message is related to a PS Data Off exempt service, on the basis of the reception of the MA PDU session information.

9 Claims, 23 Drawing Sheets

(58) Field of Classification Search
USPC .......................................................... 709/227
See application file for complete search history.

(56) References Cited

U.S. PATENT DOCUMENTS

| | | | | |
|---|---|---|---|---|
| 10,911,979 | B2* | 2/2021 | Huang-Fu | H04W 28/0273 |
| 11,039,295 | B2* | 6/2021 | Baek | H04W 8/12 |
| 11,240,733 | B2* | 2/2022 | Kubota | H04W 48/06 |
| 11,259,342 | B2* | 2/2022 | Gupta | H04W 76/12 |
| 11,297,530 | B2* | 4/2022 | Dao | H04W 4/24 |
| 11,337,139 | B2* | 5/2022 | Foti | H04W 88/06 |
| 11,343,653 | B2* | 5/2022 | Talebi Fard | H04W 4/08 |
| 11,343,737 | B2* | 5/2022 | Park | H04W 80/08 |
| 11,405,854 | B2* | 8/2022 | Rönneke | H04W 8/02 |
| 11,425,762 | B2* | 8/2022 | Li | H04W 76/10 |
| 11,496,573 | B2* | 11/2022 | Dao | H04W 40/02 |
| 11,533,594 | B2* | 12/2022 | Purkayastha | H04W 76/12 |
| 11,539,763 | B2* | 12/2022 | Oyman | H04L 65/752 |
| 11,564,157 | B2* | 1/2023 | Li | H04W 8/18 |
| 11,570,828 | B2* | 1/2023 | Jimenez Cordon | |
| | | | | H04L 63/1458 |
| 11,575,796 | B2* | 2/2023 | Cai | H04L 12/1407 |
| 11,576,042 | B2* | 2/2023 | Starsinic | H04W 8/183 |
| 11,595,968 | B2* | 2/2023 | Chou | H04W 72/542 |
| 11,627,622 | B2* | 4/2023 | Kumar | H04W 60/00 |
| | | | | 370/329 |
| 11,632,756 | B2* | 4/2023 | Xu | H04B 7/0695 |
| | | | | 370/329 |
| 11,638,208 | B2* | 4/2023 | Salkintzis | H04W 76/10 |
| | | | | 455/434 |
| 11,652,719 | B2* | 5/2023 | Salkintzis | H04W 24/08 |
| | | | | 370/252 |
| 11,665,212 | B2* | 5/2023 | Chiang | H04W 28/0268 |
| | | | | 370/229 |
| 2019/0313311 | A1* | 10/2019 | Huang-Fu | H04L 67/143 |
| 2019/0350043 | A1* | 11/2019 | Huang-Fu | H04W 36/0069 |
| 2019/0357090 | A1* | 11/2019 | Drevon | H04W 4/24 |
| 2021/0258763 | A1* | 8/2021 | Melander | H04L 65/1069 |
| 2022/0116462 | A1* | 4/2022 | Cai | H04W 28/10 |
| 2022/0191664 | A1* | 6/2022 | Muñoz De La Torre Alonso | |
| | | | | H04L 67/14 |
| 2022/0201553 | A1* | 6/2022 | Keller | H04W 28/10 |
| 2022/0303854 | A1* | 9/2022 | Salkintzis | H04W 36/26 |
| 2022/0353336 | A1* | 11/2022 | Cañete Martinez | H04W 76/10 |
| 2022/0393972 | A1* | 12/2022 | Salkintzis | H04W 40/12 |

OTHER PUBLICATIONS

LG Electronics Inc., "Clarification on the traffic handling over non-3GPP access for PS Data Off," 3GPP TSG-SA WG1 Meeting # 89e, S1-201032, Electronic Meeting, Feb. 10-14, 2020, 3 pages.
Qualcomm Incorporated et al., "Enforcing maximum UP resources activation of 2 PDU sessions for NB-IoT," 3GPP TSG-SA WG2 Meeting #136, S2-1912425, Nov. 18-22, 2019, Reno, NV, US, 27 pages.

* cited by examiner

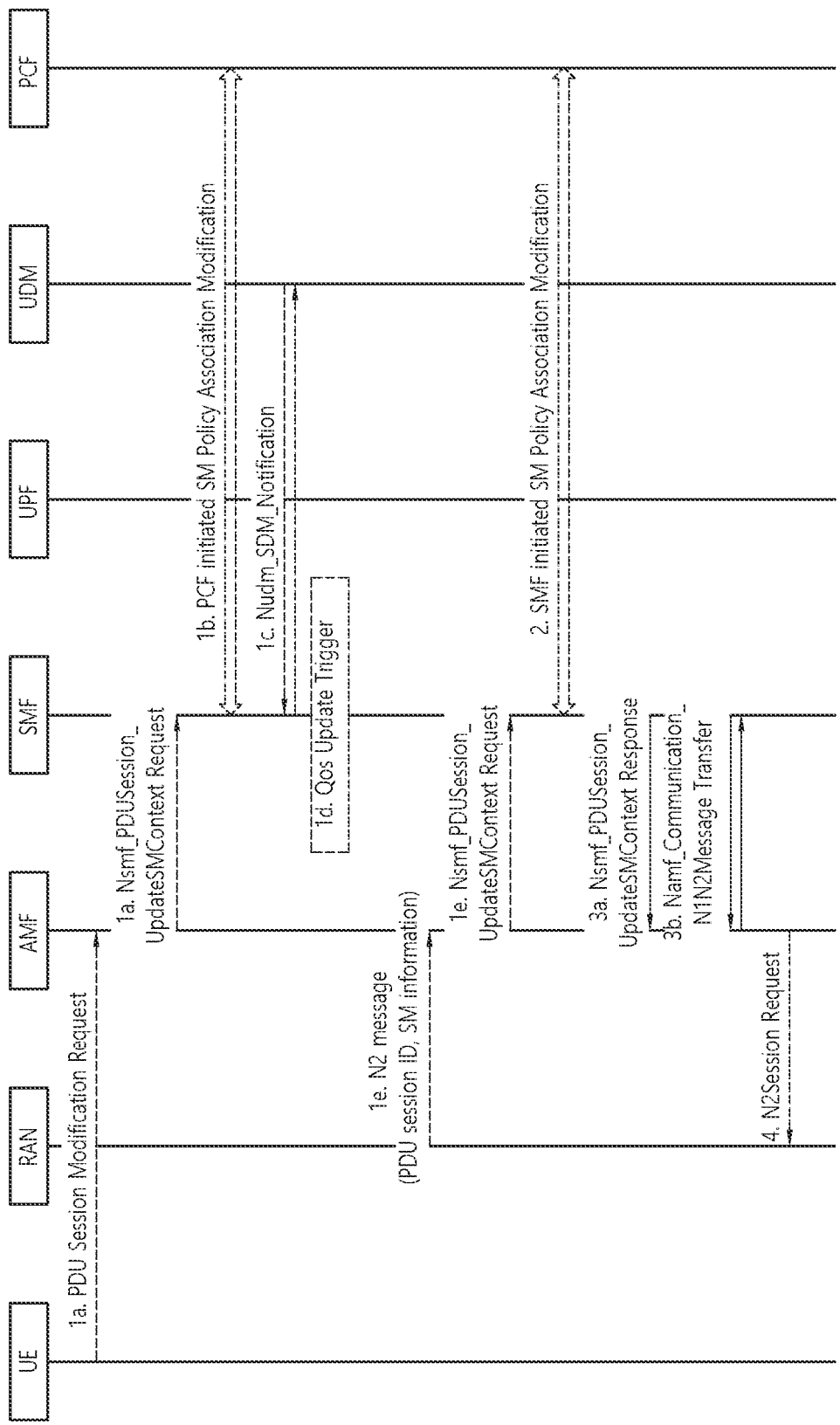

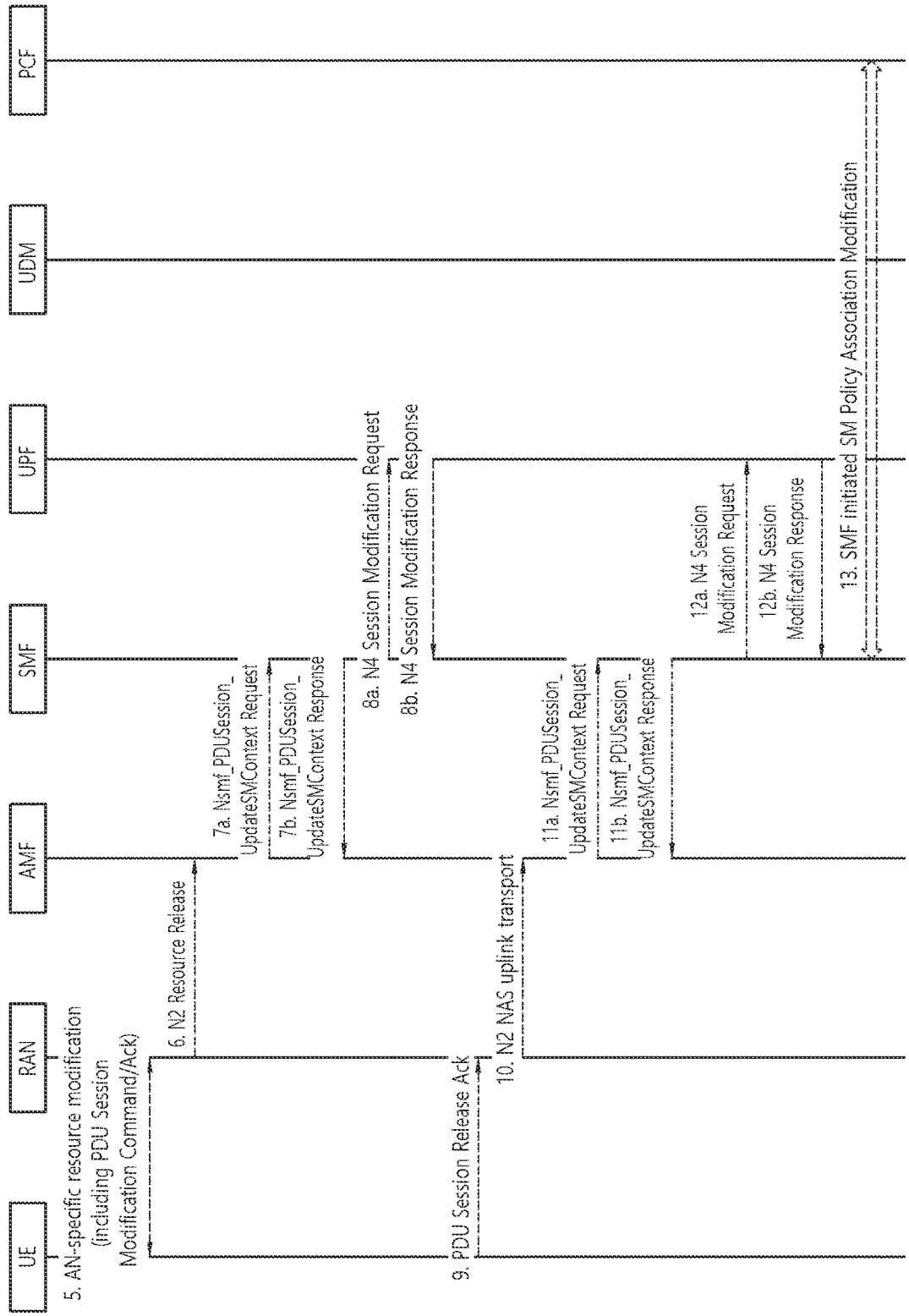

COMMUNICATION RELATED TO MULTI-ACCESS PDU SESSIONS

CROSS-REFERENCE TO RELATED APPLICATIONS

This application is a National Stage application under 35 U.S.C. § 371 of International Application No. PCT/KR2021/001679, filed on Feb. 9, 2021, which claims the benefit of Korean Patent Application No. 10-2020-0017906, filed on Feb. 13, 2020. The disclosures of the prior applications are hereby incorporated by reference herein in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Meanwhile, in 5G mobile communication, the 3rd Generation Partnership Project (3GPP) Packet Switch (PS) Data Off function may be used. Discussion is ongoing that 3GPP PS Data Off should be supported even for Multi Access (MA) Packet Data Unit (PDU) sessions. However, conventionally, when 3GPP PS Data Off is used for the MA PDU session, a method for supporting efficient communication has not been discussed.

SUMMARY

Accordingly, a disclosure of the present specification has been made in an effort to solve the aforementioned problem.

In order to solve the above problems, one disclosure of the present specification provides a method for a network node to perform communication related to an MA PDU session. The method includes: receiving a SIP registration message including MA PDU session information from the UE; receiving a SIP message related to the IMS service for the MA PDU session from another network node; and transmitting, to the PCF node, information on whether the SIP message is related to the PS Data Off exception service, based on the reception of the MA PDU session information.

In order to solve the above problems, one disclosure of the present specification provides a method for a UE to perform communication related to a MA PDU session. The method includes: transmitting a Session Initiation Protocol (SIP) registration message including MA PDU session information to a network node of an IMS network; and transmitting information indicating that Packet Switch (PS) Data Off status is activated to a network node of the IMS network.

In order to solve the above problems, one disclosure of the present specification provides a network node that performs communication related to a MA PDU session. The network node includes at least one processor; and at least one memory for storing instructions and operably electrically connectable with the at least one processor, wherein the operations performed based on the instructions being executed by the at least one processor include: receiving a SIP registration message including a MA PDU session information from the UE; receiving a SIP message related to the IMS service for the MA PDU session from another network node; and transmitting, to the PCF node, information on whether the SIP message is related to the PS Data Off exception service, based on the reception of the MA PDU session information.

In order to solve the above problems, one disclosure of the present specification provides a UE performing communication related to a MA PDU session. The UE includes at least one processor; and at least one memory for storing instructions and operably electrically connectable with the at least one processor, wherein the operations performed based on the instructions being executed by the at least one processor include: transmitting a Session Initiation Protocol (SIP) registration message including a MA PDU session information to a network node of the IMS network; and transmitting information indicating that Packet Switch (PS) Data Off status is activated to a network node of the IMS network.

In order to solve the above problems, one disclosure of the present specification provides an apparatus in mobile communication. The apparatus includes at least one processor; and at least one memory that stores instructions and is operably electrically connectable with the at least one processor, wherein the instructions are executed based on execution by the at least one processor. The operations include: identifying a SIP registration message containing MA PDU session information; identifying a SIP message related to an IMS service for the MA PDU session; and generating information on whether the SIP message is related to a PS Data Off exception service based on the reception of the MA PDU session information.

In order to solve the above problems, one disclosure of the present specification provides a non-volatile computer-readable storage medium in which instructions are recorded. The instructions, when executed by one or more processors, cause the one or more processors to: identifying a SIP registration message comprising MA PDU session information; identifying a SIP message related to an IMS service for the MA PDU session, and generating information on whether the SIP message is related to a PS Data Off exception service based on the reception of the MA PDU session information.

According to the disclosure of the present specification, it is possible to solve the problems of the related art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIGS. 10A and 10B are signal flow diagrams illustrating an exemplary PDU session modification procedure.

DESCRIPTION OF EXEMPLARY EMBODIMENTS

Figure 1:
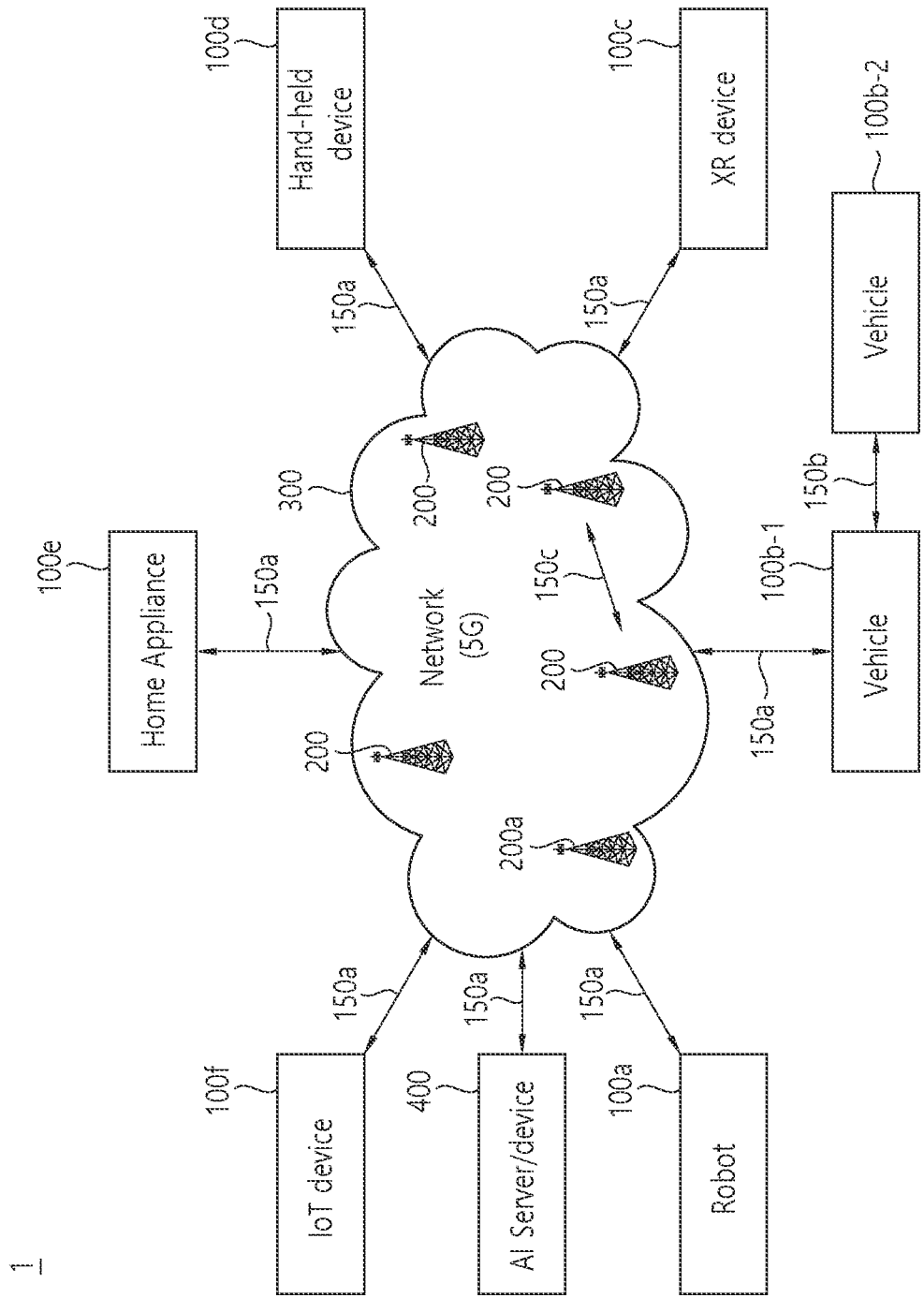
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the attached drawings, user equipments (UEs) are shown for example. The UE may also be denoted a terminal or mobile equipment (ME). In addition, the UE may be a laptop computer, a mobile phone, a PDA, a smartphone, a multimedia device, or other portable device, or may be a stationary device such as a PC or a car mounted device.

Hereinafter, the UE is used as an example of a wireless communication device (or a wireless apparatus, or a wireless device) capable of wireless communication. An operation performed by the UE may be performed by a wireless communication device. A wireless communication device may also be referred to as a wireless apparatus, a wireless device, or the like. Hereinafter, AMF may mean an AMF node, SMF may mean an SMF node, and UPF may mean a UPF node.

The term "base station" used hereinafter generally refers to a fixed station that communicates with a wireless device and may be denoted by other terms such as evolved-NodeB (eNodeB), evolved-NodeB (eNB), Base Transceiver System (BTS), access point, or Next generation NodeB (gNB).

I. Techniques and Procedures Applicable to the Disclosure of the Present Specification FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles.

The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
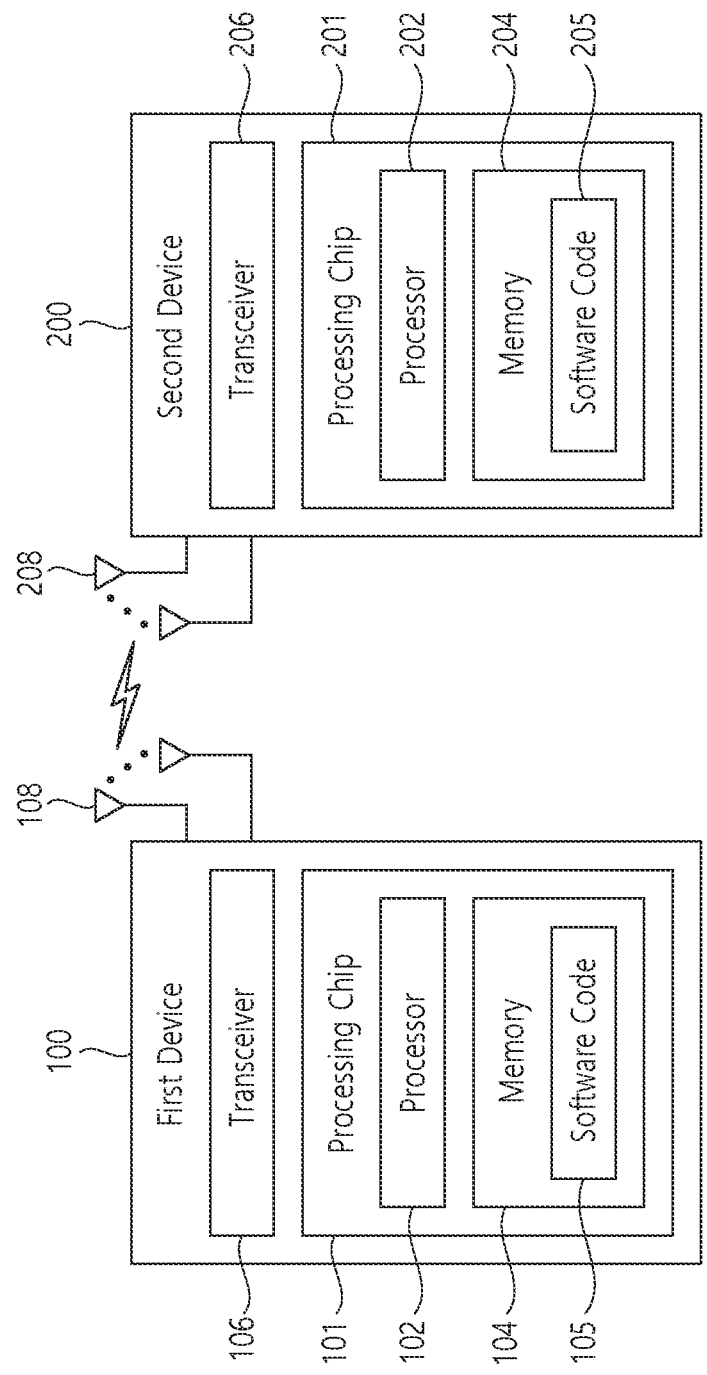
FIG. 2 shows an example of a wireless device to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
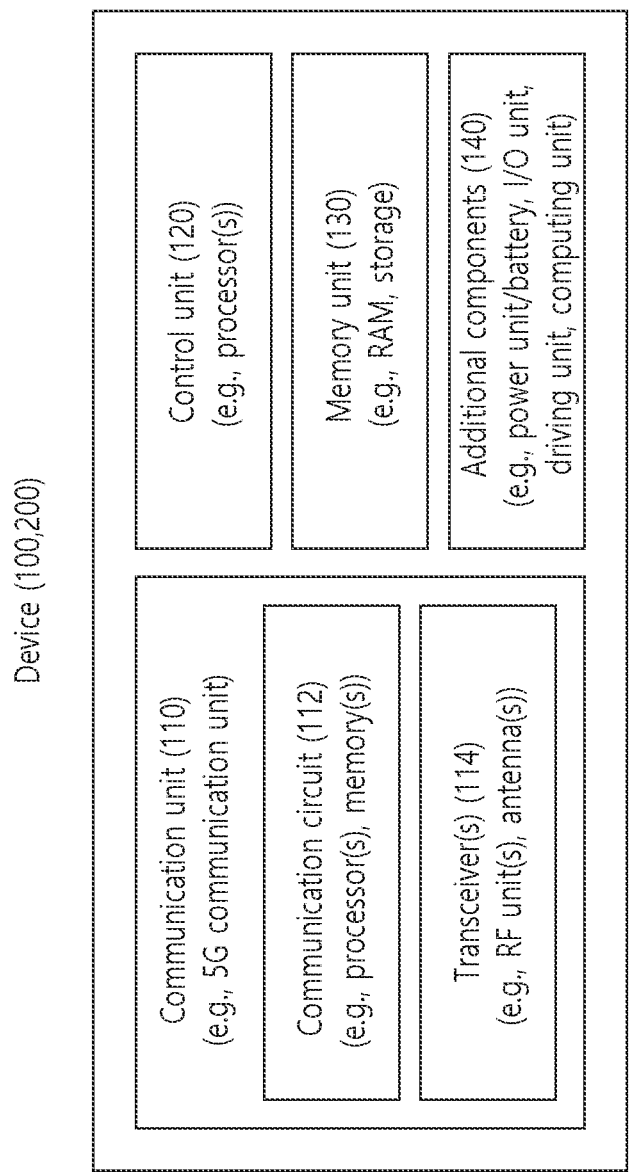
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video 1/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
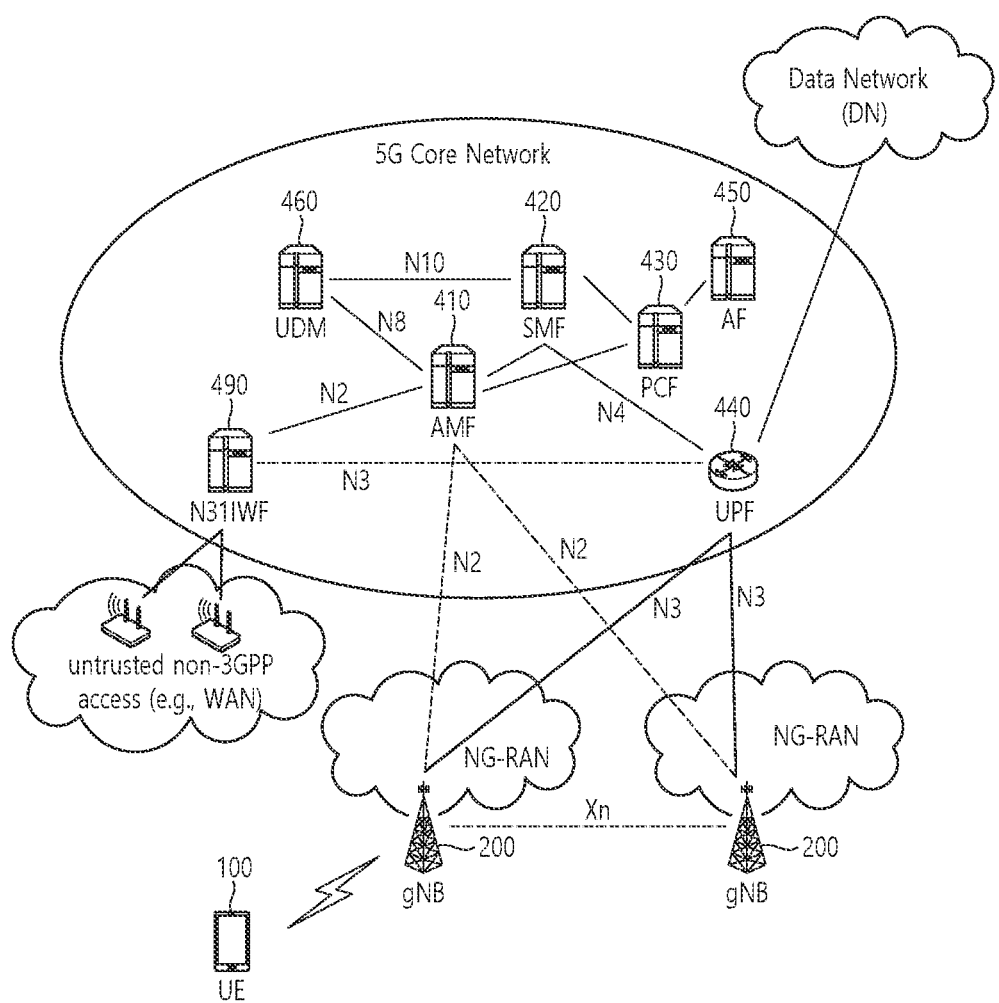
FIG. 4 is a structural diagram of a next-generation mobile communication network.

FIG. 4 is a structural diagram of a next-generation mobile communication network.

5GC (5G Core) may include various components, part of which are shown in FIG. 4, including an access and mobility management function (AMF) 410, a session management function (SMF) 420, a policy control function (PCF) 430, a User Plane Function (UPF) 44, an application function (AF) 450, a unified data management (UDM) data network 460, and a non-3GPP (3rd Generation Partnership Project) inter-working function (N3IWF) 490.

A UE 100 is connected to a data network via the UPF 440 through a Next Generation Radio Access Network (NG-RAN) including the gNB 20.

The UE 100 may be provided with a data service even through untrusted non-3GPP access, e.g., a wireless local area network (WLAN). In order to connect the non-3GPP access to a core network, the N3IWF 490 may be deployed.

The illustrated N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing Non-Access Stratum (NAS) security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 20 and the SMF 420. In addition, when the UE 100 moves over an area served by the gNB 20, the UPF 440 serves as a mobility anchor point. The UPF 440 may perform a function of handling a PDU. For mobility within the NG-RAN (which is defined after 3GPP Release-15), the UPF 440 may route packets. In addition, the UPF 540 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 44 may correspond to a termination point of a data interface toward the data network.

The illustrated PCF 430 is a node that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (100) may be omitted.

The $5^{th}$ generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

Figure 5:
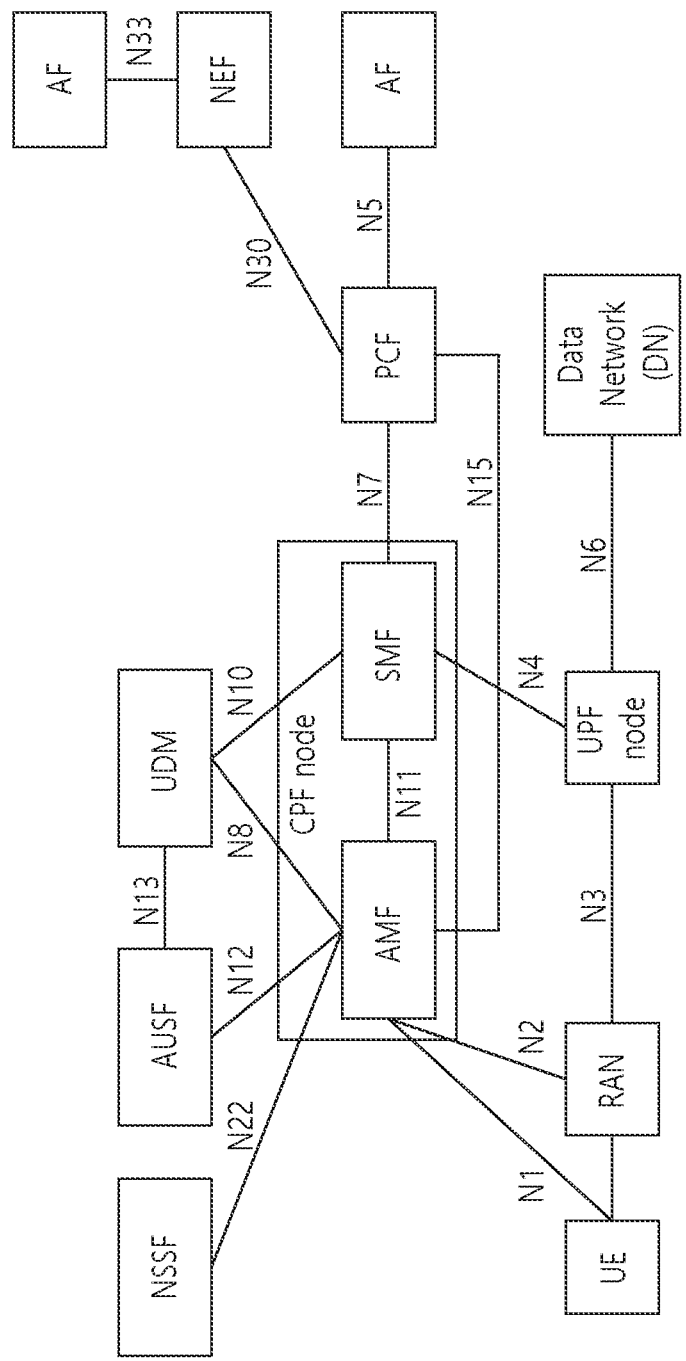
FIG. 5 is an exemplary diagram illustrating a predicted structure of a next generation mobile communication in terms of a node.

FIG. 5 is an exemplary diagram illustrating a predicted structure of a next generation mobile communication in terms of a node.

Referring to FIG. 5, the UE is connected to a data network (DN) through a next generation RAN (Radio Access Network).

The Control Plane Function (CPF) node shown in FIG. 5 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 5 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 6:
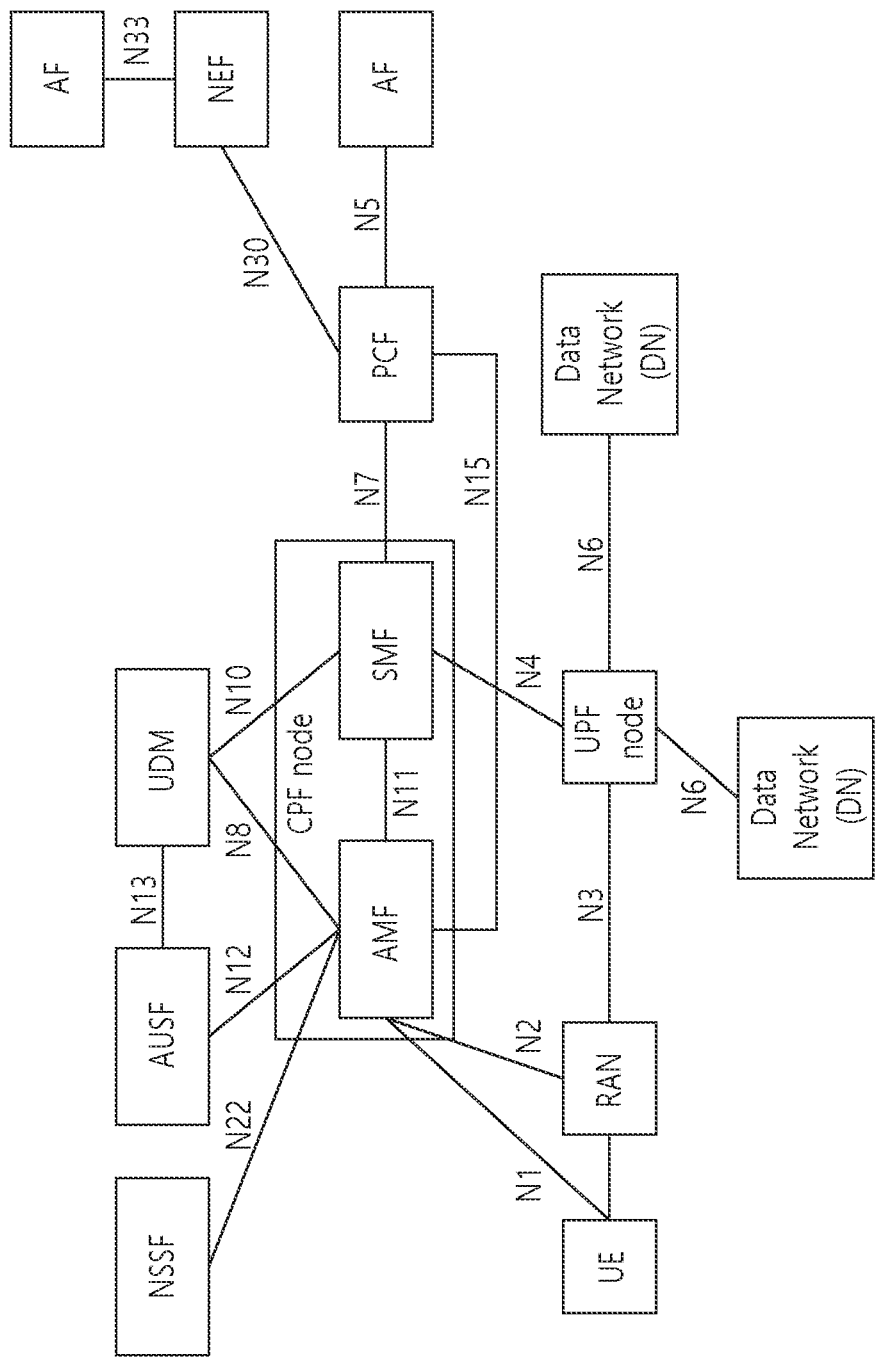
FIG. 6 is an exemplary diagram illustrating an architecture that allows the UE to simultaneously access two data networks using one PDU session.

In FIG. 6, the UE may simultaneously access two data networks using multiple PDU sessions.

FIG. 6 is an exemplary diagram illustrating an architecture that allows the UE to simultaneously access two data networks using one PDU session.

FIG. 6 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

Figure 7:
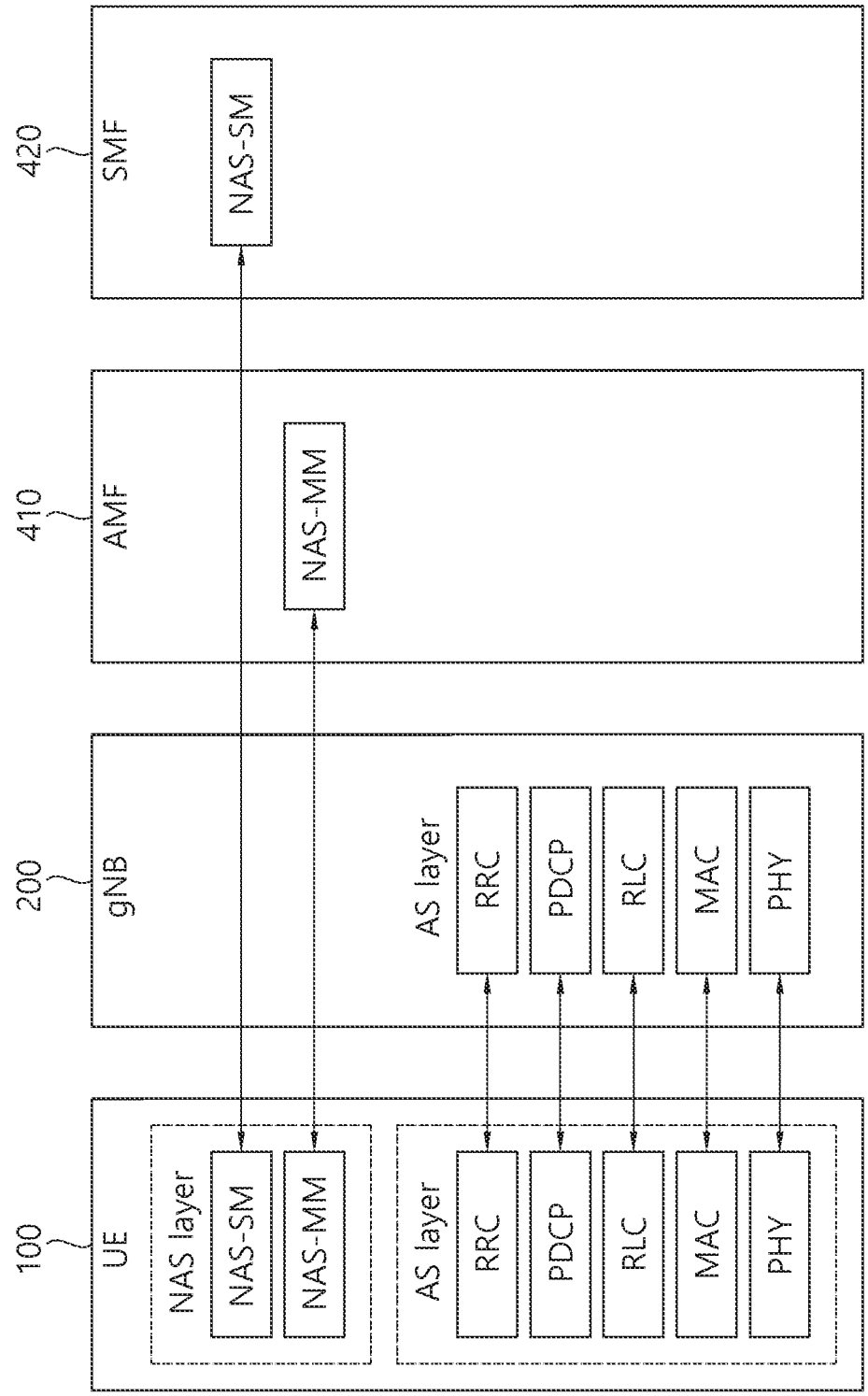
FIG. 7 is another exemplary diagram showing a structure of a radio interface protocol between a UE and a gNB.

FIG. 7 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.
  NAS procedures related to AMF include the following.
  Registration management and access management procedures. AMF supports the following functions.
  Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
  The NAS entity for the MM creates a NAS-MM message that derives how and where to deliver an SM signaling message through a security header representing the NAS transmission of SM signaling and additional information on a received NAS-MM.
  Upon receiving SM signaling, the NAS entity for the SM performs an integrity check of the NAS-MM message, analyzes additional information, and derives a method and place to derive the SM signaling message.

Meanwhile, in FIG. 7, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

<Registration Procedure>

The UE needs to obtain an authorization to enable mobility tracking and to receive data, and to receive services. For this, the UE must register with the network. The registration procedure is performed when the UE needs to do initial registration with the 5G system. In addition, the registration procedure is performed when the UE performs periodic registration update, when the UE is in an idle mode and moving to a new tracking area (TA), and when the UE needs to perform periodic registration update.

During the initial registration procedure, the ID of the UE may be obtained from the UE. AMF may pass PEI (IMEISV) to UDM, SMF and PCF.

Figure 8A:
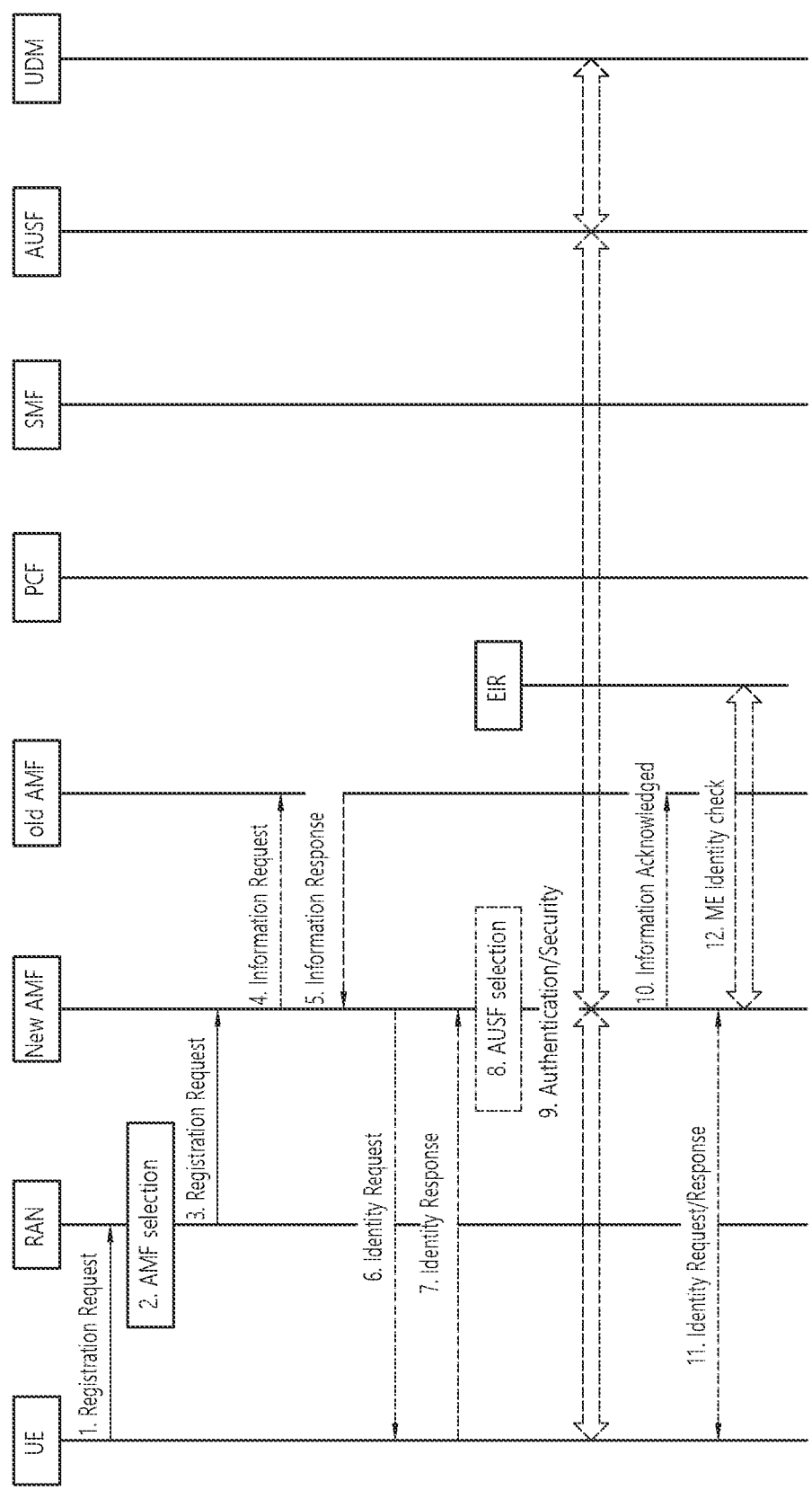
FIGS. 8A and 8B are signal flow charts showing an exemplary registration procedure.
Figure 8B:
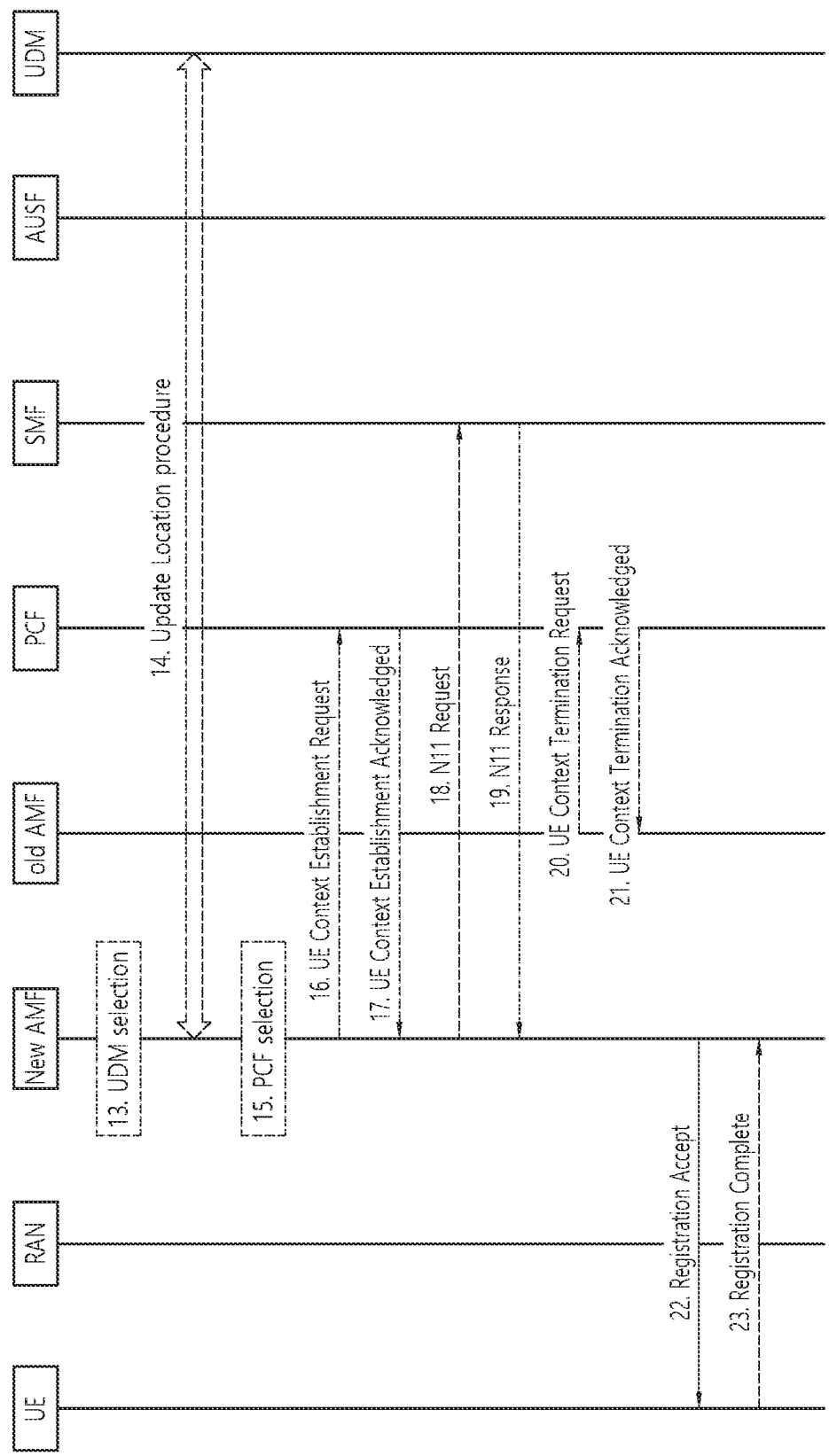

FIGS. 8A and 8B are signal flowcharts showing an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN (Public Land Mobile Network) other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI of the allowed NSSAI to the S-NASSI of the NSSAI configured for Home Public Land Mobile Network (HPLMN).

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 9A:
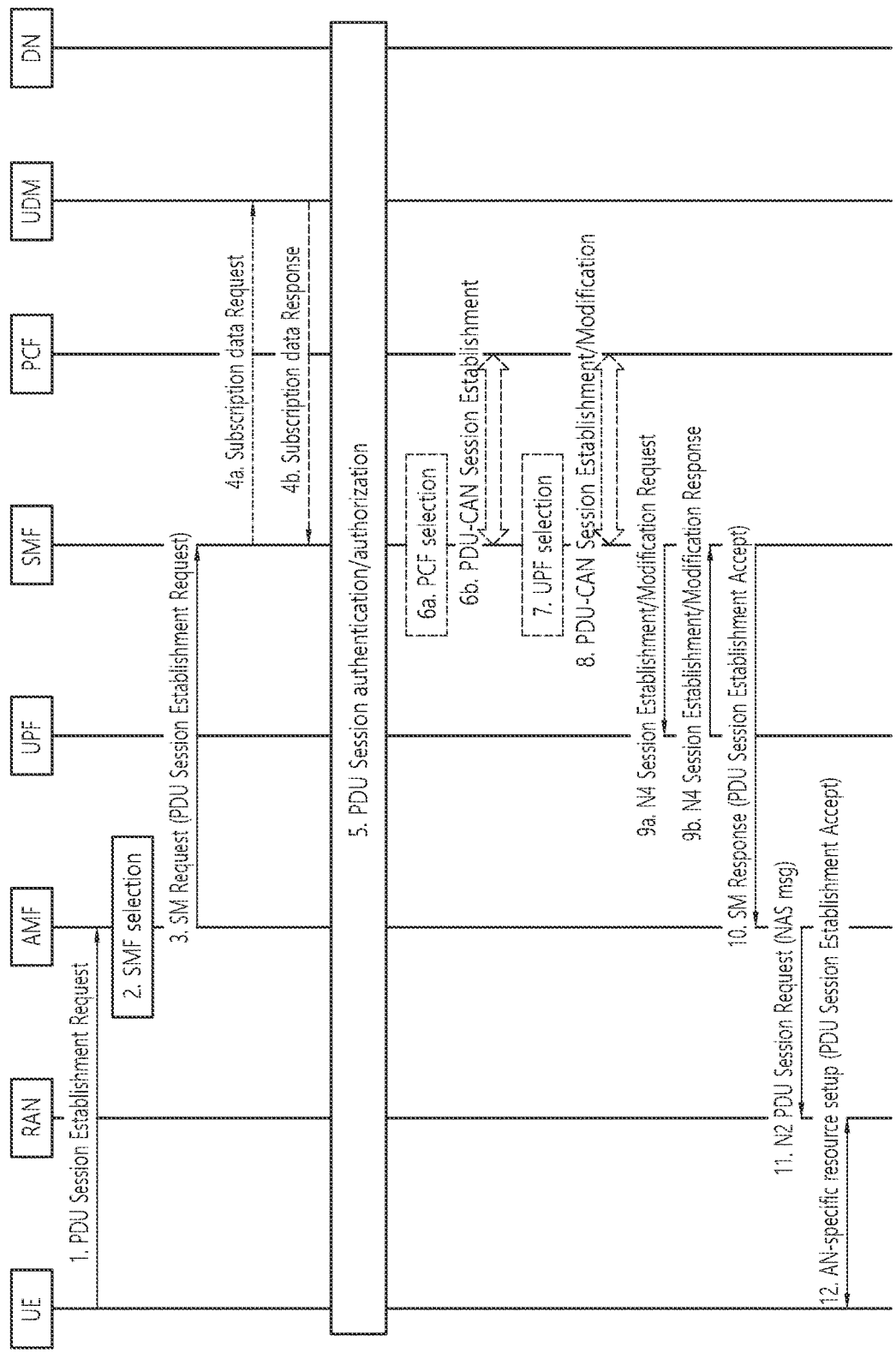
FIGS. 9A and 9B are signal flowcharts illustrating an exemplary PDU session establishment procedure.
Figure 9B:
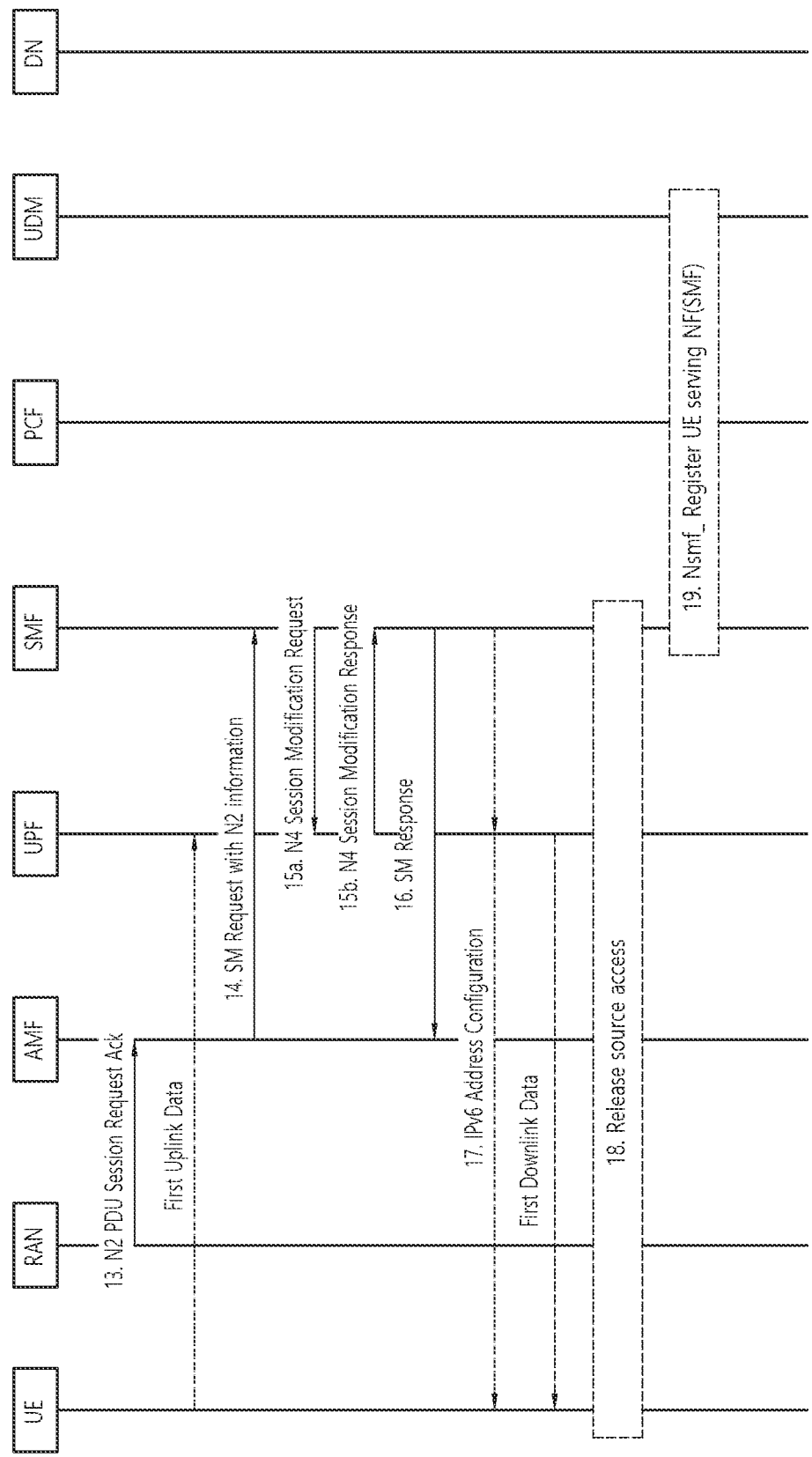

FIGS. 9A and 9B are a signal flowchart illustrating an exemplary PDU session establishment procedure.

The procedure shown in FIGS. 9A and 9B assumes that the UE has already registered on the AMF according to the registration procedure shown in FIGS. 8A and 8B. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, The UE may extract and store the information of the allowed S-NSSAI and the mapped S-NSSAI included in the registration accept message received from the network (ie, AMF) in the registration procedure of FIGS. 8A and 8B. Accordingly, the UE may transmit the PDU session establishment request message by including both the S-NSSAI based on the allowed NSSAI and the corresponding S-NSSAI based on the mapped NSSAI information.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM_Register UE serving NF service" including an SMF address and DNN. The UDM may store the ID, address, and DNN of the SMF.

During the procedure, if the PDU Session Establishment is not successful, the SMF notifies this to the AMF.

<PDU Session Modification Procedure>

FIGS. 10A and 10B are signal flow diagrams illustrating an exemplary PDU session modification procedure.

The PDU session modification procedure may be used when one or more Quality of Service (QoS) parameters exchanged between the UE and the network are modified.

The signal flow diagram shown in FIGS. 10A and 10B is an example of a PDU session modification procedure, and specifically, a UE or network requested PDU Session Modification procedure (non-roaming case and roaming with local breakout case) is shown as an example.

An example of a PDU session modification procedure may be triggered by the following exemplary events (steps 1a) to 1e)):

1a)(UE-initiated modification) The UE may initiate a PDU session modification procedure by sending a NAS message.

For example, the UE may send a PDU session modification request message. Here, the NAS message may include an N1 SM container, a PDU session ID, and a UE Integrity Protection Maximum Data Rate. N1 SM container may include PDU session modification request (PDU Session ID, Packet Filters, Operation, Requested QoS, Segregation, 5GSM Core Network Capability, Number of Packet Filters, if Always-on PDU Session is requested, Always-on PDU Session Requested).

Depending on the access type, if the UE was in the CM-IDLE state, a service request procedure may be preceded before this SM-NAS message is transmitted. (Depending on the Access Type, if the UE was in CM-IDLE state, this SM-NAS message is preceded by the Service Request procedure.) (R)AN is delivered to the AMF along with the indication of the user location information (User location Information).

The AMF may invoke the SM context associated with the PDU session update. For example, AMF may call Nsmf_PDUSession_UpdateSMContext. Nsmf_PDUSession_UpdateSMContext may include an SM context ID and an N1 SM container (including a PDU session modification request).

When the UE requests a specific QoS handling for the selected Service Data Flow (SDF), the PDU session establishment request may include a packet filter describing the SDF, the requested packet filter operation (add, modify or delete) for the indicated packet filter, and the requested QoS. The PDU session establishment request may optionally include a Segregation indication. When the UE requests the network to bind the applicable SDF to a distinct and dedicated QoS Flow (eg, even if an existing QoS flow can support the requested QoS), segregation indication may be included in the PDU session establishment request. The network must comply with the UE's request, but the network may bind the selected SDF for the existing QoS flow instead of the UE's request.

Note 1: Only one QoS flow can be used for traffic segregation. When the UE makes a subsequent request for segregation of the additional SDF, the additional SDF is multiplexed in the existing QoS flow used for segregation.

If the UE is outside the availability area of the LADN (Local Area Data Network), the UE does not trigger a PDU session modification procedure for the PDU session corresponding to the LADN.

For a PDU session established in EPS, when the UE first moves from EPS to 5GS, when the UE wants to change the PDU session to an always-on PDU session, the UE may include an indication that an Always-on PDU session is requested in the PDU session modification request message.

1b) (Modification requested by PCF) The PCF may perform a PCF initiated SM Policy Association Modification procedure to notify the SMF of the modification of the policy. The PCF-initiated SM policy association modification procedure may be triggered, for example, by a policy decision or may be triggered when an application function (AF) requests.

1c) (Modification requested by SMF) The UDM may use Subscriber Data Management (SDM) notifications to update the subscription data of the SMF. For example, the SDM notification may be Nudm_SDM_Notification (including Subscription Permanent Identifier (SUPI) and Session Management Subscription Data). The SMF may acknowledge by updating the session management subscription data and returning SUPI and Ack.

1d) (Modification requested by SMF) The SMF may decide to modify the PDU session. Step 1d) may also be triggered from a locally configured policy or (R)AN. Step 1d) may also be triggered when the SMF marks that the UP (User Plane) connection is active and the status of one or more QoS flows has been deleted in 5GC but not synchronized with the UE.

When the SMF receives one of the triggers of steps 1b) to 1d), the SMF may initiate a PDU session modification procedure requested by the SMF.

1e) (AN-initiated modification) Regardless of whether a notification control is set or not, when an AN resource to which a QoS flow is mapped is released, (R)AN must indicate to the SMF. (R)AN may transmit an N2 message (including PDU session ID and N2 SM information) to the AMF. The N2 SM information may include a QoS flow ID (QFI), user location information, and an indication that a QoS flow has been released.

The AMF may call the SM context request associated with the update of the PDU session. For example, the AMF may invoke Nsmf_PDUSession_UpdateSMContext (including SM context ID and N2 SM information).

(AN Initiated Notification Control) When notification control is set for a GBR flow, if (R)AN determines that the QoS target of the QoS flow cannot be met or that the QoS target of the QoS flow can be met again, respectively, (R)AN may transmit an N2 message (including PDU session ID and N2 SM information) to the SMF. The N2 SM information may include an indication that the QoS target of the QFI and QoS flow cannot be met or an indication that the QoS target of the QoS flow may be met again, respectively. The AMF may call the SM context request associated with the update of the PDU session. For example, the AMF may invoke Nsmf_PDUSession_UpdateSMContext (including SM context ID and N2 SM information). When the PCF subscribed to the event, the SMF may report this event to the PCF for each PCC rule for which notification control is set (see step 2). Alternatively, if the dynamic PCC does not apply to this DNN and depends on a locally set policy, the SMF may initiate the PDU session modification procedure requested by the SMF as in the example of step 3b).

2) The SMF may report some subscribed events to the PCF by performing the SMF initiation SM policy association modification procedure. Step 2) may be omitted when the PDU session modification procedure is triggered by step 1b or 1d. If the dynamic PCC is not deployed (deployed), the SMF may apply a local policy to determine whether to change the QoS profile.

Steps 3) to 7) may not be invoked when only an operation (eg gating) in UPF is required for PDU session modification.

3a) For UE-initiated modification or AN-initiated modification, SMF may respond to AMF via PDU session update SM context. For example, the PDU session update SM context may be Nsmf_PDUSession_UpdateSMContext. Nsmf_PDUSession_UpdateSMContext may include N2 SM information (PDU session ID, QFI, QoS profile, session-Aggregate Maximum Bit Rate (AMBR)), and N1 SM container (including PDU Session Modification Command). PDU session modification command may include PDU session ID, QoS rule, QoS rule operation, QoS flow level QoS parameters if necessary for QoS related to QoS rule, Session-AMBR, Always-on PDU Session Requested if Always-on PDU Session is requested.

When PDU session modification has been requested by the UE, in order to modify the PDU session always-on PDU session, the SMF may include an Always-on PDU Session Granted indication in the PDU session modification command. The Always-on PDU session grant indication may be included to indicate whether the PDU session is changed to an Always-on PDU session or not.

The N2 SM information may carry information to be provided by the AMF to the (R)AN. To notify the (R)AN that one or more QoS flows have been added or modified, the N2 SM information may include a QoS profile and a corresponding QFI. The N2 SM information may include only the QFI to notify the (R)AN that one or more QoS flows have been removed. If the PDU session modification is triggered by the (R)AN release of step 1e), the SM information may carry the acknowledgment of the (R)AN release. When the UE requests a PDU session modification for a PDU session without an established user plane resource, the N2 SM information provided to (R)AN may include information for establishing a user plane resource.

The N1 SM container carries the PDU session modification command that the AMF should provide to the UE. In order to notify the UE that one or more QoS rules have been added, removed, or modified, the N1 SM container may include QoS rules, QoS rules and QoS related QoS rules operations, if necessary, QoS flow level QoS parameters and QoS flow level QoS parameter operation.

3b) For the modification requested by the SMF, the SMF may invoke Namf_Communication_N1N2MessageTransfer. Namf_Communication_NIN2MessageTransfer may include N2 SM information (PDU session ID, QFI(s), QoS Profile(s), session-AMBR), and N1 SM container (including PDU session modification command). The PDU session modification command may include PDU session ID, QoS rules, QoS rules and QoS flow-level QoS parameters if necessary for QoS related to QoS rules operation and QoS rules, session-AMBR.

When the UE is in the CM-IDLE state and Asynchronous Type Communication (ATC) is activated, the AMF may update and store the UE context based on Namf_Communication_N1N2MessageTransfer, and steps 4) to 7) may be omitted. For reference, when the ATC mode is activated, paging is not performed for the UE in the IDLE state. When the UE is reachable (eg, when the UE enters the CM-CONNECTED state), the AMF may forward an N1 message to synchronize the UE and the UE context.

4) AMF may transmit an N2 PDU session request message to (R)AN. The N2 PDU session request may include N2 SM information received from the SMF, a NAS message (including a PDU session ID, and an N1 SM container (including a PDU session modification command)).

5) (R)AN may issue an AN specific signaling exchange with the UE related to information received from the SMF. For example, in the case of NG-RAN, RRC Connection Reconfiguration may occur when the UE modifies necessary (R)AN resources related to the PDU session.

(R)AN may acknowledge the N2 PDU session request by sending an N2 PDU session Ack message to the AMF. The N2 PDU session Ack message may include N2 SM information (list of accepted/rejected QFIs, AN tunnel information, PDU session ID, Secondary RAT using data) and user location information. In the case of Dual Connectivity, when one or more QFIs are added to a PDU session, the master RAN node transmits one or more QFIs of these QFIs to the NG-RAN node (the NG-RAN that was not previously involved in the PDU session) node) can be assigned. In this case, the AN tunnel information may include a new N3 tunnel endpoint for the QFI allocated to the new NG-RAN node. Accordingly, when one or more QFIs are removed from the PDU session, the (R)AN node is no longer involved in the PDU session, and the corresponding tunnel endpoint is removed from the AN tunnel information. If the QFI cannot meet the user plane security enhancement information for the corresponding QoS profile (eg, due to the UE Integrity Protection Maximum Data Rate being exceeded), the NG-RAN may reject the QFI.

When the PLMN sets a second RAT usage reporting, the NG-RAN node may provide a RAN usage data report.

7) AMF may deliver N2 SM information and user location information received from AN to SMF through Nsmf_PDUSession_UpdateSMContext service operation. The SMF may reply to the AMF with an Nsmf_PDUSession_UpdateSMContext response. The N2 SM information may include second RAT usage data.

When (R)AN rejects the QFI, the SMF is responsible for updating the QoS flow level QoS parameters if necessary for the QoS rules at the UE and the QoS flows associated with the QoS rules.

8) The SMF may update the N4 session of the UPF related to the PDU session modification by sending the N4 session modification request message to the UPF (refer to Note 3).

When a new QoS flow is generated, the SMF may update the UPF with UL Packet Detection Rules of the new QoS flow.

Note 2: UL packets with QFI of new QoS flow may be delivered via update.

9) The UE may acknowledge the PDU session modification command by sending a NAS message. The NAS message may include a PDU session ID and an N1 SM container (including PDU session modification command Ack).

10) (R)AN may forward NAS message to AMF.

11) AMF may transmit N1 SM container (including PDU session modification command Ack) and user location information received from AN to SMF through Nsmf_PDUSession_UpdateSMContext service operation.

The SMF may reply using the Nsmf_PDUSession_UpdateSMContext response.

If the SMF-initiated PDU session modification procedure is to delete QoS flows that do not contain QoS flows associated with the default QoS rules (eg, when triggered by PCF), and the SMF does not receive a response from the UE, the SMF marks the state of these QoS flows to be synchronized with the UE.

12) The SMF may update the N4 session of the UPF that is not related to the modification of the PDU session by sending the N4 session modification request message (including the N4 session ID) to the UPF. For a PDU session of the Ethernet PDU session type, the SMF may notify the UPF to add or remove an Ethernet Packet Filter Set and a forwarding rule(s).

Note 3: UPFs affected by the PDU session modification procedure depend on the modified QoS parameters and deployment. For example, when the session AMBR of a PDU session having a UL CL (Uplink Classifier) is changed, only the UL CL may be related. This note can also be applied to step 8).

13) When the SMF interacts with the PCF in step 1b) or 2), the SMF may perform the SMF-initiated SM policy association modification procedure to notify the PCF whether the PCC decision is enforced or cannot be enforced.

The SMF may notify any entity subscribed to the user location information related to the PDU session change.

When step 1b) is triggered to perform an application function effect on traffic routing, the SMF may re-establish the user plane of the PDU session.

<Multi-Access (MA) PDU Session>

In the prior art, the MA PDU session is a session that can be serviced simultaneously with 3GPP access and non-3GPP access using one PDU session.

Figure 11:
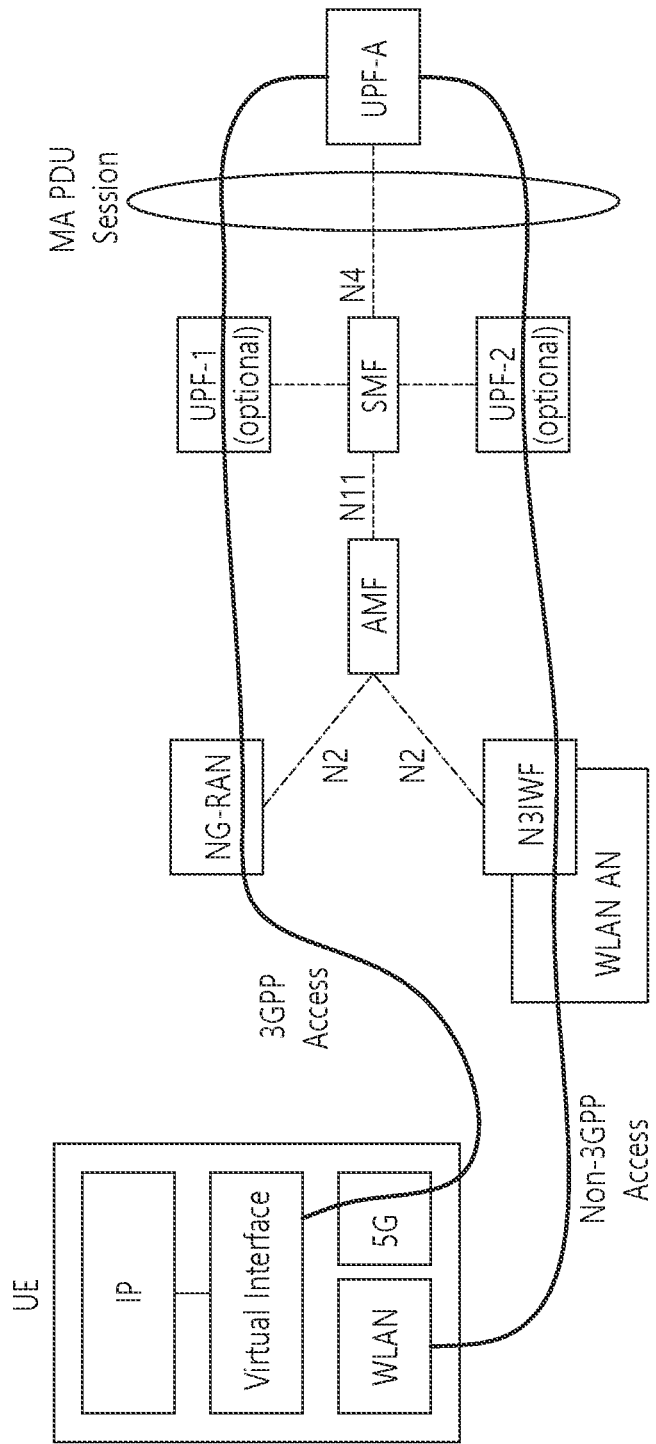
FIG. 11 shows an example in which a MA PDU session is generated.

FIG. 11 shows an example in which a MA PDU session is generated.

In FIG. 11, the MA PDU session is one PDU session and has a separate session tunnel for each access. One is established on 3GPP access, and the other PDU session is established on untrusted non-3GPP access (e.g., WLAN AN).

Since the MA PDU session is one session, the MA PDU session has the following characteristics.

(i) one DNN;
(ii) one UPF Anchor (UPF-A);
(iii) one PDU type (e.g., IPv6);
(iv) one session IP address
(v) one SSC mode
(vi) one HPLMN S-NSSAI.

The MA PDU session enables a multipath data link between the UE and UPF-A. This can be implemented below the IP layer.

A MA PDU session may be established through one of the following procedures.

(i) It can be established through two separate PDU session establishment procedures. This is called individual establishment.

(ii) It may be established through one MA PDU session establishment procedure. That is, the MA PDU session is simultaneously established in two accesses with one session establishment request. This is called binding establishment.

After the MA PDU session is established, Session Management (SM) signaling related to the MA PDU session may be transmitted and received through random access.

A. Individual Establishment of MA PDU Session

A MA PDU session may be established through two separate PDU session establishment procedures. For example, the UE may establish a MA PDU session on 3GPP access, and then perform a PDU session establishment procedure on non-3GPP access in order to add non-3GPP access to the MA PDU session created on 3GPP access. The request type in the establishment request message for adding the second access may be set to "MA PDU Request".

B. Binding Establishment.

A MA PDU session may be simultaneously established for 3GPP access and non-3GPP access through one procedure. Such one procedure may be referred to as a MA PDU session establishment procedure by UE request. The above procedure may be useful when the UE intends to establish a MA PDU session while the UE is already registered with 5GC through two accesses. Instead of performing two separate PDU session establishment procedures, the UE may establish a MA PDU session by performing one MA PDU session establishment procedure.

Figure 12:
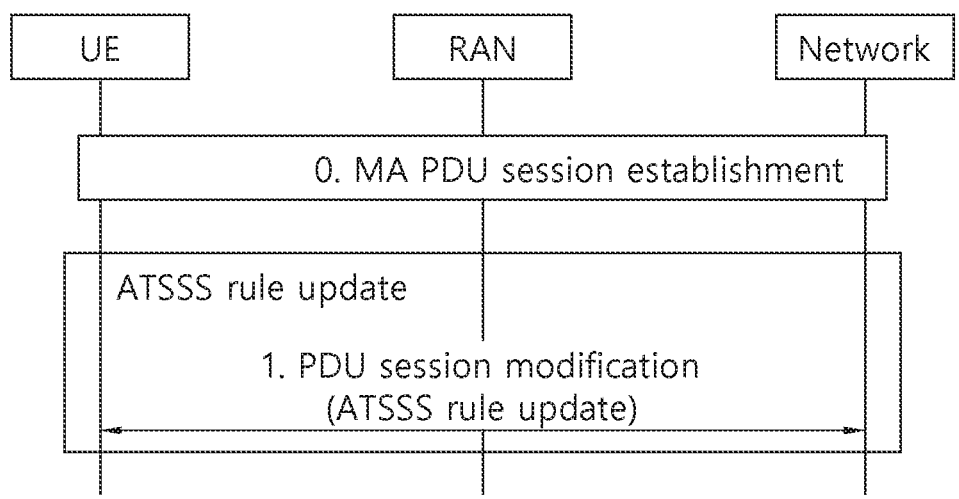
FIG. 12 shows an example of applying the ATSSS rule to the MA PDU session.

FIG. 12 shows an example of applying the ATSSS rule to the MA PDU session.

Referring to FIG. 12, if the SMF wants to move an IP flow transmitted to non-3GPP access to 3GPP access in a state in which a multi-access (MA) PDU session is established, through 3GPP access, updated ATSSS (Access Traffic Steering, Switching and Splitting) rules can be transmitted.

<Access Traffic Steering, Switching & Splitting (ATSSS)>

The ATSSS function may be an optional feature supported by the UE and the 5GC network.

The ATSSS function may enable a multi-access PDU Connectivity Service. For example, the ATSSS function may exchange PDUs between the UE and the data network by using one 3GPP access network and one non-3GPP access network simultaneously, and using two independent N3/N9 tunnels between the PSA and RAN/AN. The multi-access PDU connection service may be realized by establishing a Multi-Access PDU (MA PDU) Session. The MA PDU session may be, for example, a PDU session with user-plane resources in two access networks.

If the UE is registered through 3GPP and non-3GPP access, or if the UE is registered with only one access, the UE may request a MA PDU session.

After the MA PDU session is established, if user-plane resources exist in both access networks, in order to determine how to distribute uplink traffic through the two access networks, the UE applies network-provided policies (eg, ATSSS rules) and exchange local conditions (eg, network interface availability, signal loss conditions, user preferences, etc.). Similarly, the UPF anchor of the MA PDU session applies the network provision policy (e.g. N4 rule) and feedback information received from the UE through the user plane (e.g. access network unavailability or availability) to determine to distribute downlink traffic to two N3/N9 tunnel and to two access networks. If only one access network has a user plane resource, to trigger the establishment or activation of a user plane resource through the other access, the UE may apply the ATSSS rule, and may consider local conditions.

The MA PDU session type may be, for example, one of IPv4, IPv6, IPv4v6 and Ethernet. Unstructured types may not be supported in the current version.

ATSSS functionality can be supported over any type of access network. Here, all types of access networks may include untrusted non-3GPP access networks and trusted non-3GPP access networks, wireline 5G access networks, and the like. As long as the MA PDU session can be established over any type of access network, the ATSSS function can be supported over any type of access network.

Hereinafter, a function for enabling ATSSS will be described.

First, the MA PDU session will be described. MA PDU sessions can be managed using the session management function with the following additions and modifications:

1) If the UE wants to request a new MA PDU session:

When the UE is registered in the same PLMN through 3GPP access and non-3GPP access, the UE may transmit a PDU session establishment request message including "MA PDU Request" through one of the two accesses. The AMF may inform the SMF that the UE is registered via both accesses. The AMF notifying the SMF may trigger establishment of user-plane resources in both accesses and two N3/N9 tunnels between the PDU session anchor (PSA) and the RAN/AN.

When the UE is registered with different PLMNs through 3GPP access and non-3GPP access, the UE may transmit a PDU session establishment request message including "MA PDU Request" through one of the two accesses. After this PDU session is established in one N3/N9 tunnel between the PSA and (R)AN/AN, the UE may transmit a PDU session establishment request message including "MA PDU Request" and the same PDU session ID via the other access. User-plane resources in both accesses and two N3/N9 tunnels between PSA and RAN/AN may be established.

If the UE is registered through only one access, the UE may transmit a PDU session establishment request message including an indication of "MA PDU Request" through the access in which the UE is registered. One N3/N9 tunnel between PSA and RAN/AN and user-plane resources in this access may be established. After the UE is registered through the second access, the UE may establish user-plane resources in the second access.

In the PDU session establishment request message transmitted to request a new MA PDU session, the UE may provide ATSSS capability information of the UE. ATSSS capability (capabilities) information may include information about the steering mode and steering functionalities supported by the UE.

If the UE indicates that it can support ATSSS-LL (Low Layer) function with any steering mode, and the network accepts to activate this function, the network may provide UE Measurement Assistance Information to the UE. And, the network may provide one or more ATSSS rules to the UE.

The UE indicates that the UE can support the MPTCP function in any steering mode, and can support the ATSSS-LL function only in the Active-Standby steering mode, and the network may accept to activate these functions. In this case, the network provides MPTCP proxy information to the UE, the network may allocate one IP address/prefix for the MA PDU session and two additional IP addresses/prefixes called "link-specific multipath" to the UE. Additionally, the network may provide the UE with UE measurement assistance information and provide the UE with one or more ATSSS rules, including ATSSS rules for non-MPTCP traffic. ATSSS rules for non-MPTCP traffic can use the ATSSS-LL function and Active-Standby steering mode to indicate how non-MPTCP traffic is transmitted over 3GPP access and non-3GPP access in the uplink direction.

If the UE indicates that it can support MPTCP functions with all steering modes and ATSSS-LL functions with all steering modes, and the network accepts to enable these functions, the network may provide MPTCP proxy information to the UE. In addition, the network may allocate one IP address/prefix for the MA PDU session and two additional IP addresses/prefix called "link-specific multipath" to the UE. The network may provide UE measurement assistance information and one or more ATSSS rules to the UE.

If the UE requests S-NSSAI, S-NSSAI shall be allowed in both accesses. Otherwise, the MA PDU session may not be established.

The SMF may determine ATSSS capabilities supported for the MA PDU session, based on ATSSS capabilities provided by the UE and the DNN configuration of the SMF. The SMF may perform the following actions:

a) if the UE includes "MPTCP functionality with any steering mode and ATSSS-LL functionality with only Active-Standby steering mode" in the ATSSS capability; and a-1) If the DNN configuration allows MPTCP and ATSSS-LL for all steering modes, for the MA PDU session, (1) MPTCP and ATSSS-LL may be possible for all steering modes in downlink, (2) uplink MPTCP and ATSSS-LL may be possible in Active-Standby mode; or a-2) If the DNN configuration allows MPTCP for all steering mode and allows ATSSS-LL for Active-Standby mode, for MA PDU session, MPTCP and ATSSS-LL are possible in Active-Standby mode in uplink and downlink.

b) If the UE includes "ATSSS-LL functionality with any steering mode" in the ATSSS capability, and the DNN settings allow ATSSS-LL with any steering mode, the MA PDU session will cover all steering modes in uplink and downlink. ATSSS-LL may be possible.

c) If the UE includes "MPTCP functionality with any steering mode and ATSSS-LL functionality with any steering mode" in the ATSSS capability, and the DNN configuration allow MPTCP and ATSSS-LL for all steering modes, for the MA PDU session, MPTCP and ATSSS-LL may be possible with all steering modes in uplink and downlink.

The SMF may provide the ATSSS capability of the MA PDU session to the PCF while the PDU session establishment procedure is being performed.

Policy and charging control (PCC) rules provided by the PCF may include ATSSS control information. The PCC rule and ATSSS control information may be used by the SMF to derive the ATSSS rule for the UE and the N4 rule for the UPF. For MA PDU session, if dynamic PCC rule is not used, SMF may provide ATSSS rule and N4 rule to UE and UPF, respectively, based on local configuration (eg, local configuration based on DNN or S-NSSAI).

The UE may receive the ATSSS rule from the SMF. The ATSSS rule may indicate how to route uplink traffic through 3GPP access and non-3GPP access. Similarly, the UPF may receive the N4 rule from the SMF. The N4 rule may indicate how to route downlink traffic through 3GPP access and non-3GPP access.

When the SMF receives the PDU session establishment request message including the "MA PDU Request" indication, and if UP security protection is required for the PDU session, the SMF may confirm the establishment of the MA PDU session only if UP security protection requiring 3GPP access can be enforced. The SMF need not to check whether it can enforce UP security protections that require non-3GPP access.

2) After the MA PDU session establishment procedure (ie, after the MA PDU session is established), the following description may be applied:

at any given time, a MA PDU session may have user-plane resources in both 3GPP access and non-3GPP access, may have user-plane resources in only one access, or may not have user-plane resources in any access.

Even if the UE deregisters from one access, AMF, SMF, PCF and UPF can maintain their MA PDU session contexts if the UE is registered with another access When the UE deregisters from one access and the UE is registered for another access, the AMF may inform the SMF that the access type for the MA PDU session has become unavailable. Thereafter, the SMF may inform the UPF that the access type of the deregistered access has become unavailable and that the N3/N9 tunnel for the corresponding access type has been released.

When the UE wants to add a user-plane resource in one access of the MA PDU session (eg, based on access network performance measurement and/or ATSSS rules), the UE may transmit a PDU session establishment request message over this access. Here, the PDU session establishment request message may include a PDU session ID of the MA PDU session and an "MA PDU Request" indication. For this access, if N3/N9 do not exist, N3/N9 for this access may be established.

When the UE wants to re-activate a user-plane resource in one access of the MA PDU session (eg, based on access network performance measurement and/or ATSSS rules), the UE may initiate a UE Triggered Service Request procedure through this access.

3) When the network wants to re-activate the user-plane resource through 3GPP access or non-3GPP access of the MA PDU session, the network may initiate a Network Triggered Service Request procedure.

A MA PDU session may also be established in one of the following cases:

a) when the establishment of the MA PDU session is explicitly requested by the ATSSS-capable UE; or b) If the ATSSS-capable UE requests a single-access PDU session, but the network decides to establish the MA PDU session instead, the MA PDU session may be established. This example may correspond to an optional scenario, this example may occur when a UE that requires single access for a PDU session has requested a single-access PDU session, but when there are no a policy (e.g. UE route selection policy (URSP) rule) and local restrictions.

When the UE moves from EPS to 5GS, a MA PDU session may be established while the PDU session modification procedure is performed.

An ATSSS-capable UE may decide to request a MA PDU session based on the provided URSP rule. In particular, if the URSP rule triggers the UE to establish a new PDU session, and if the access type preference component of the URSP rule indicates "Multi-Access", the UE may request an MA PDU session when the UE applies the URSP rule.

Hereinafter, a policy for ATSSS control will be described.

While the establishment of the MA PDU session is being performed, if a dynamic PCC is used for the MA PDU session, the PCF may perform ATSSS policy determination and create a PCC rule including ATSSS policy control information. Here, the ATSS policy control information may be used to determine how uplink traffic and downlink traffic of the MA PDU session are distributed through 3GPP access and non-3GPP access.

The SMF may receive the PCC rule together with the ATSSS policy control information from the PCF. And, the SMF may map these rules to (a) the ATSSS rule transmitted to the UE and (b) the N4 rule transmitted to the UPF. The ATSSS rule may be a prioritized list of rules that the UE applies to enforce the ATSSS policy in the uplink direction. And, the N4 rule may be applied by the UPF to enforce the ATSSS policy in the downlink direction.

When a MA PDU session is created or the MA PDU session is updated by the SMF (for example, after the SMF receives an updated (or new) PCC rule from the PCF), the ATSSS rule may be transmitted to the UE along with the NAS message. Similarly, the N4 rule may be transmitted to the UPF when a MA PDU session is created or the MA PDU session is updated by the SMF.

For ATSSS, Quality of Service (QoS) may be supported. Hereinafter, QoS support (QoS support) will be described.

The 5G QoS model for single access PDU sessions can also be applied to MA PDU sessions. For example, the QoS flow may be the finest granularity of QoS differentiation in the MA PDU session. Compared to a single-access PDU session, one difference is that in the MA PDU session, there may be separate user plane tunnels between the AN and the PSA, and each user plane tunnel may be related to a specific access (either 3GPP access or non-3GPP access). However, QoS flows may not be associated with a particular access. That is, since QoS flows are access-agnostic, the same QoS can be supported when traffic is distributed through 3GPP access and non-3GPP access. SMF may provide the same QoS Flow ID (QFI) in 3GPP access and non-3GPP access, so that the same QoS is supported in both access.

In ATSSS, the Steering function may be supported. Hereinafter, the Steering function will be described.

The functionality of ATSSS-capable UE (ATSSS-capable UE) that ATSSS-capable UE (ATSSS-capable UE) can steer (coordinate), switch, and split the traffic of the MA PDU session through 3GPP access and non-3GPP access can be referred to as "steering functionality". An ATSSS capable UE may support one or more of the following types of steering functions:

1) A high-layer steering function that operates above the Internet Protocol (IP) layer may be supported. For example, a high-layer steering function "MPTCP functionality" applying a Multipath Transmission Control Protocol (MPTCP) protocol may be supported. Here, this steering function ("MPTCP functionality") can be applied to steer, switch, and split TCP traffic of applications that are allowed to use MPTCP. The MPTCP function of the UE may communicate with the associated MPTCP Proxy function of the UPF via the 3GPP user plane and/or the non-3GPP user plane.

2) A low-layer steering function that operates below the IP layer may be supported. For example, a low-layer steering function called "ATSSS Low-Layer functionality" or ATSSS-LL functionality may be supported. Here, this steering function ("ATSSS Low-Layer functionality" or ATSSS-LL functionality) can be applied to steer, switch, and split any type of traffic (including TCP traffic, User Datagram Protocol (UDP) traffic, Ethernet traffic, etc.). ATSSS-LL functionality must be supported in an Ethernet-type MA PDU session. In the network, one UPF supporting ATSSS-LL must exist in the data path of the MA PDU session.

The UE may indicate to the network the steering function and steering mode supported by the UE by including one of the following in the UE ATSSS Capability:

1) ATSSS-LL functionality with any steering mode. In this case, the UE may indicate that it can steer, switch and split all traffic of the MA PDU session using the ATSSS-LL function with all steering modes.

2) MPTCP functionality with any steering mode and ATSSS-LL functionality with only Active-Standby steering mode. In this case, ATSSS-LL function with only MPTCP function and Active-Standby steering mode with all steering modes can be supported. In this case, the UE may indicate:

2-a) The UE may use the MPTCP function with all steering modes to steer, switch and split the MPTCP traffic of the MA PDU session.

2-b) The UE may use the ATSSS-LL function with active-standby steering mode to steer, switch and split all other traffic (eg, non-MPTCP traffic) of the MA PDU session.

3) MPTCP functionality with any steering mode and ATSSS-LL functionality with any steering mode. In this case, the MPTCP function with all steering modes and the ATSSS-LL function with all steering modes may be supported. In this case, the UE may indicate:

3-a) The UE may use the MPTCP function with all steering modes to steer, switch and split the MPTCP traffic of the MA PDU session.

3-b) The UE can use the ATSSS-LL function with any steering mode to steer, switch and split all other traffic (i.e. non-MPTCP traffic) in the MA PDU session.

The steering function described above is schematically illustrated in FIG. 13, which shows an exemplary model for an ATSSS-capable UE supporting the MPTCP function and the ATSSS-LL function.

Figure 13:
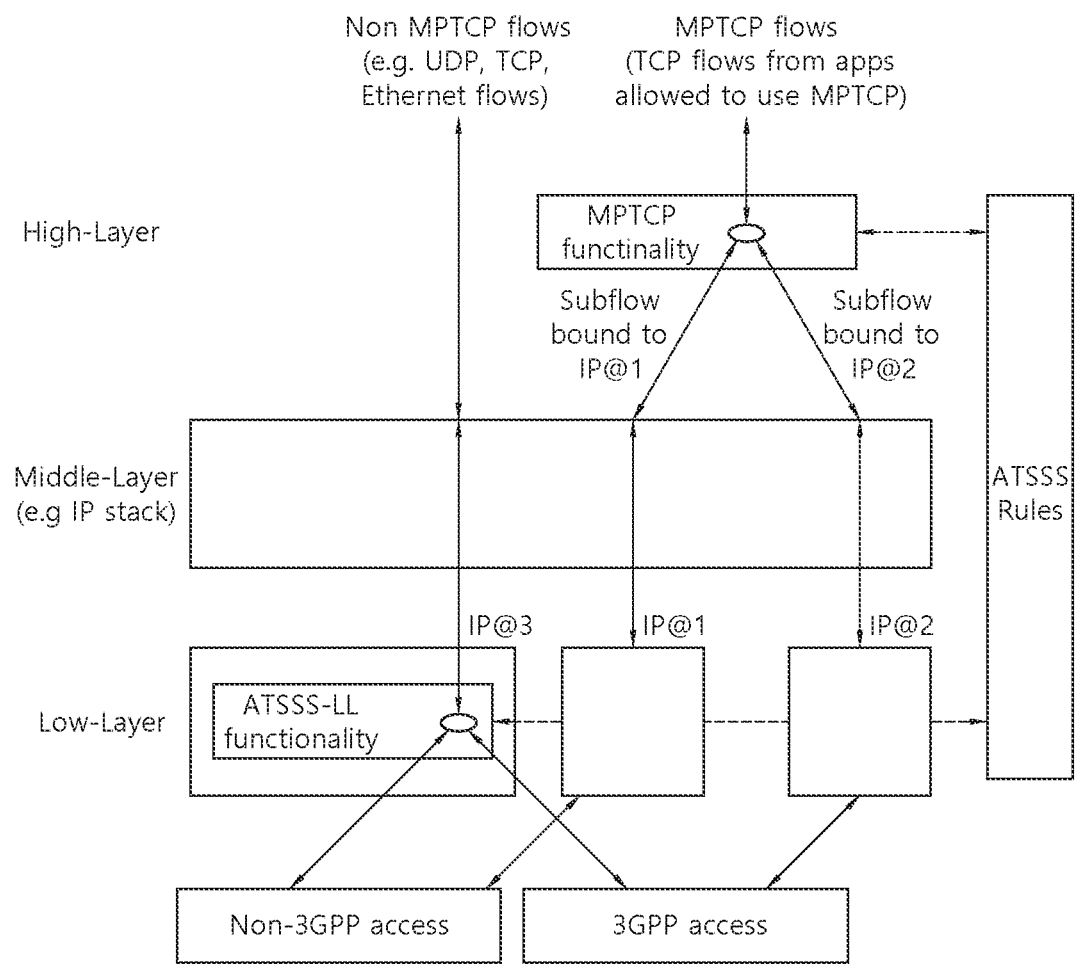
FIG. 13 is a diagram illustrating an example of a steering function of a UE.

FIG. 13 is a diagram illustrating an example of a steering function of a UE.

In the example of FIG. 13, MPTCP flow may indicate traffic of an application to which MPTCP can be applied. In the figure, three different IP addresses (eg, IP@1, IP@2, IP@3) are shown in the UE.

The "Low-Layer" in this figure may contain functions operating below the IP layer (eg other network interfaces of the UE), and the "High-Layer" may contain functions operating above the IP layer.

Within the same MA PDU session of the UE, the MPTCP function may be used to steer the MPTCP flow, and at the same time, the ATSSS-LL function may be used to steer all other flows. For the same packet flow, one steering function can be used.

All steering functions of the UE may use the same set of ATSSS rules to perform ATSSS decisions (eg, how to steer, switch, split traffic). Similarly, all ATSSS decisions in UPF can be performed by applying the same set of N4 rules supporting ATSSS. The ATSSS rule and the N4 rule supporting ATSSS may be provided to each of the UE and the UPF when the MA PDU session is established.

When the UE supports both MPTCP functionality and ATSSS-LL functionality, the UE may determine a steering function to be applied to a specific packet flow by using the provided ATSSS rule.

Hereinafter, the ATSSS rule will be described in detail.

After the MA PDU session is established, the UE may receive a priority list of ATSSS rules from the SMF. An example of the structure of the ATSSS rule is shown in Table 3 below.

TABLE 3

| Information name | Description | Category | SMF permitted to modify in a PDU context | Scope |
|---|---|---|---|---|
| Rule Precedence | Determines the order in which the ATSSS rule is evaluated in the UE | Mandatory (NOTE 1) | Yes | PDU context |
| Traffic Descriptor | This part defines the traffic descriptor component of the ATSSS rule. | Mandatory (NOTE 2) | | |
| Application descriptors | Includes one or more application IDs that identify the application generating the traffic (NOTE 3). | Optional | Yes | PDU context |
| IP descriptors (NOTE 4) | One or more 5-tuples that identify the destination of IP traffic. | Optional | Yes | PIU context |
| Non-IP descriptors (NOTE 4) | Includes one or more descriptors to identify the destination of non-IP traffic, such as Ethernet traffic. | Optional | Yes | PDU context |
| Access Selection Descriptor | This part defines the Access Selection Descriptor components for the ATSSS rule. | Mandatory | | |
| Steering Mode | Identifies the steering mode that may be applied for the matching traffic. | Mandatory | Yes | PIU context |
| Steering Functionality | Identifies whether the MPTCP functionality or the ATSSS - LL functionality should be applied for the matching traffic. | Optional (NOTE 5) | Yes | PDU context |

In Table 3 above, NOTE 1 to NOTE 5 are as follows:
NOTE 1:
Each ATSSS rule may have a different precedence value from the other ATSSS rules.
NOTE 2:
There may be more than one traffic decriptor component.
NOTE 3:
Application ID may include OSId (Operating System Id) and an OSAppId (Operating System Application Id).
NOTE 4:
An ATSSS rule cannot contain both IP descriptors and Non-IP descriptors.
NOTE 5:
If the UE supports only one Steering Functionality, this component is omitted.

The UE may evaluate the ATSSS rules according to priority order.

Each ATSSS rule may include a traffic descriptor (eg, including one or more components described in the example in Table 3) that may determine when the rule is applicable. When all components of the traffic descriptor match the considered service data flow (SDF), the ATSSS rule may be determined to be applicable.

Depending on the type of MA PDU session, the traffic descriptor may include components such as the following examples:

When the type of the MA PDU session is IPv4, IPv6, or IPv4v6 type: The traffic descriptor may include an application descriptor and/or an IP descriptor.

When the type of MA PDU session is Ethernet type: The traffic descriptor may include an application descriptor and/or a non-IP descriptor.

One ATSSS rule may be provided to the UE with a "match all" traffic descriptor that matches all SDFs. If this ATSSS rule is provided, this ATSSS rule may have the lowest Rule Precedence value. This ATSSS rule may be evaluated last by the UE.

Each ATSSS rule may include an access selection descriptor that includes components such as the following examples:

ATSSS rules may include Steering Mode. Steering Mode may determine how the matched SDF should be distributed over 3GPP access and non-3GPP access. Steering Modes such as the following examples may be supported:

1) Active-Standby: Active-Standby can be used to steer the SDF in one access (Active access) (if this access is available). And, when active access is unavailable, Active-Standby can be used to switch the SDF to another available access (Standby access). When active access becomes available again, the SDF can be switched back to active access. If standby access is not defined, SDF is allowed only for active access and cannot be transmitted to other accesses.

2) Smallest Delay: Smallest Delay can be used to steer the SDF to the access determined to have the smallest Round-Trip Time (RTT). Measurements may be performed by the UE and UPF to determine RTT over 3GPP access and non-3GPP access. Also, if one access becomes unavailable, SDF traffic can be switched to another available access, if allowed by PCC rules.

3) Load-Balancing: Load-Balancing can be used to split the SDF through both accesses when both accesses are available. Load-Balancing may include a percentage of SDF traffic transmitted through 3GPP access and non-3GPP access. Load-balancing can only be applied to non-GBR (Guaranteed Bit Rate) QoS flows. Also, if one access becomes unavailable, all SDF traffic may be switched to another available access, as if the percentage of SDF traffic over the other available access is 100%.

4) Priority-based: Priority-based can be used to steer the traffic of SDF with high priority access. Priority-based can be used to steer the traffic of the SDF to high priority access until it is determined that the high priority access is congested. When it is determined that the high-priority access is congested, the traffic of the SDF may be transmitted even with the low-priority access. That is, SDF traffic may be split through two accesses. Also, if high priority access becomes unavailable, all SDF traffic may be switched through low priority access. How the UE and the UPF determine when congestion occurs in access may vary by implementation.

ATSSS rules may include Steering Functionality. Steering Functionality can be used to identify whether the MPTCP function or the ATSSS-LL function can be used to steer the traffic of the matching SDF. Steering Functionality can be used when the UE supports multiple functions for ATSSS.

Note that it is not necessary to update the ATSSS rules when one access becomes available or becomes unavailable.

An example of an ATSSS rule that may be provided to a UE is described as follows:

a) ATSSS rules may include "Traffic Descriptor: UDP, DestAddr 1.2.3.4" and "Steering Mode. Active-Standby, Active=3GPP, Standby=non-3GPP":

This ATSSS rule may mean "steers UDP traffic having a destination IP address 1.2.3.4 to active access (3GPP access) when active access (3GPP access) is available. If active access is unavailable, use standby access (non-3GPP access)".

b) ATSSS rules may include "Traffic Descriptor: TCP, DestPort 8080", and "Steering Mode: Smallest Delay":

This ATSSS rule may mean "steer TCP traffic with destination port 8080 to the access with the least delay". The UE may measure the RTT over both accesses to determine the access with the least delay.

c) ATSSS rules may include "Traffic Descriptor: Application-1" Steering Mode: Load-Balancing, 3GPP=20%, non-3GPP=80%", and "Steering Functionality: MPTCP":

This ATSSS rule may mean "Using the MPTCP function, transmit 20% of application-1's traffic over 3GPP access, and transmit 80% of application-1's traffic over non-3GPP access".

<ATSSS Procedure>

Hereinafter, procedures related to ATSSS will be described. For example, the procedure for enabling support of ATSSS is described. These procedures can only be applied by ATSSS-capable UEs and 5GC networks.

The MA PDU session may enable ATSSS. The traffic of the MA PDU session may be carried over 3GPP access or non-3GPP access or both 3GPP and non-3GPP access. With the available access of the MA PDU session, the manner in which traffic is transported can be managed by the available policies created by the 5GC network.

First, the UE requested MA PDU session establishment procedure will be described.

Figure 14A:
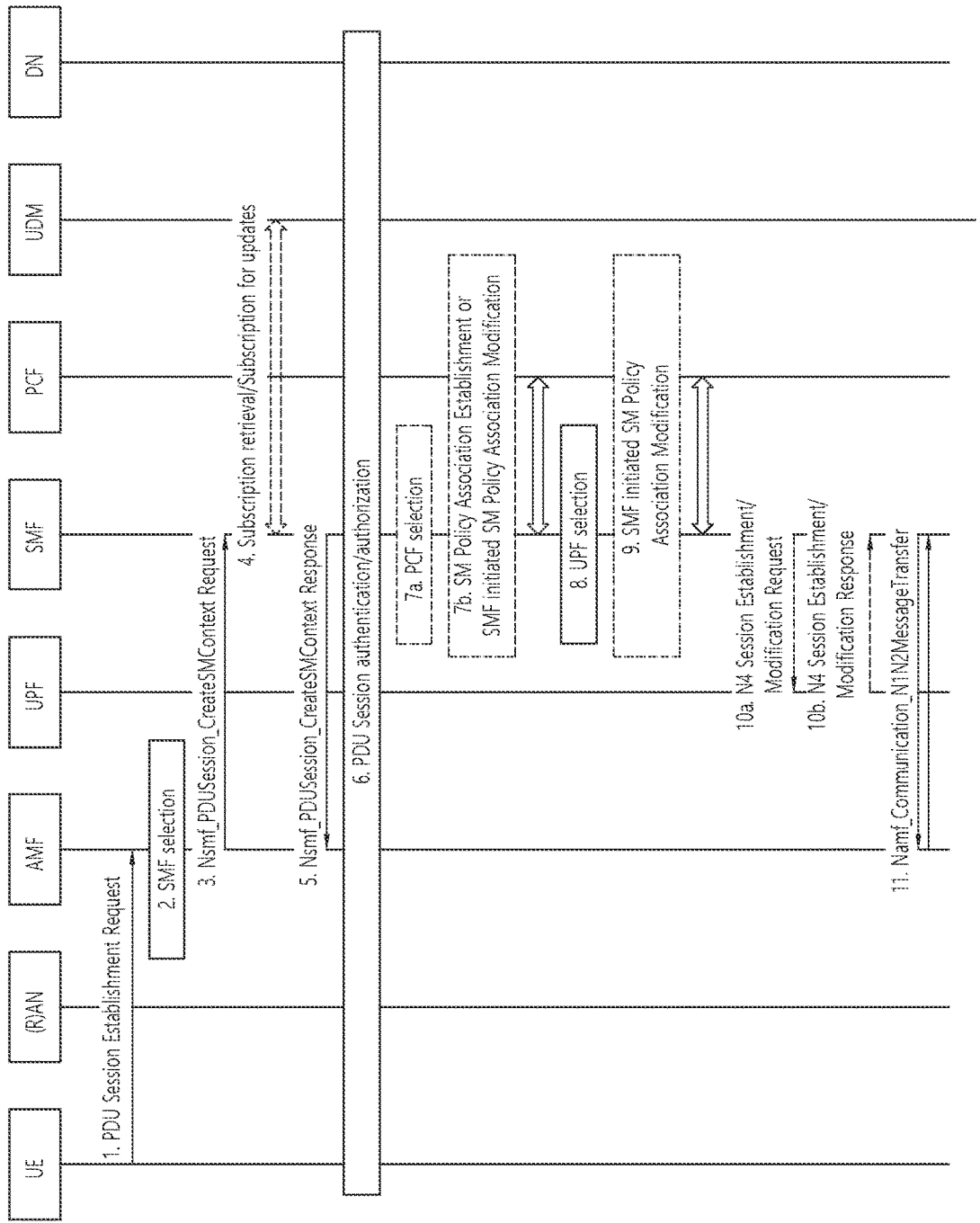
FIGS. 14A and 14B are signal flow diagrams illustrating a PDU session establishment procedure.
Figure 14B:
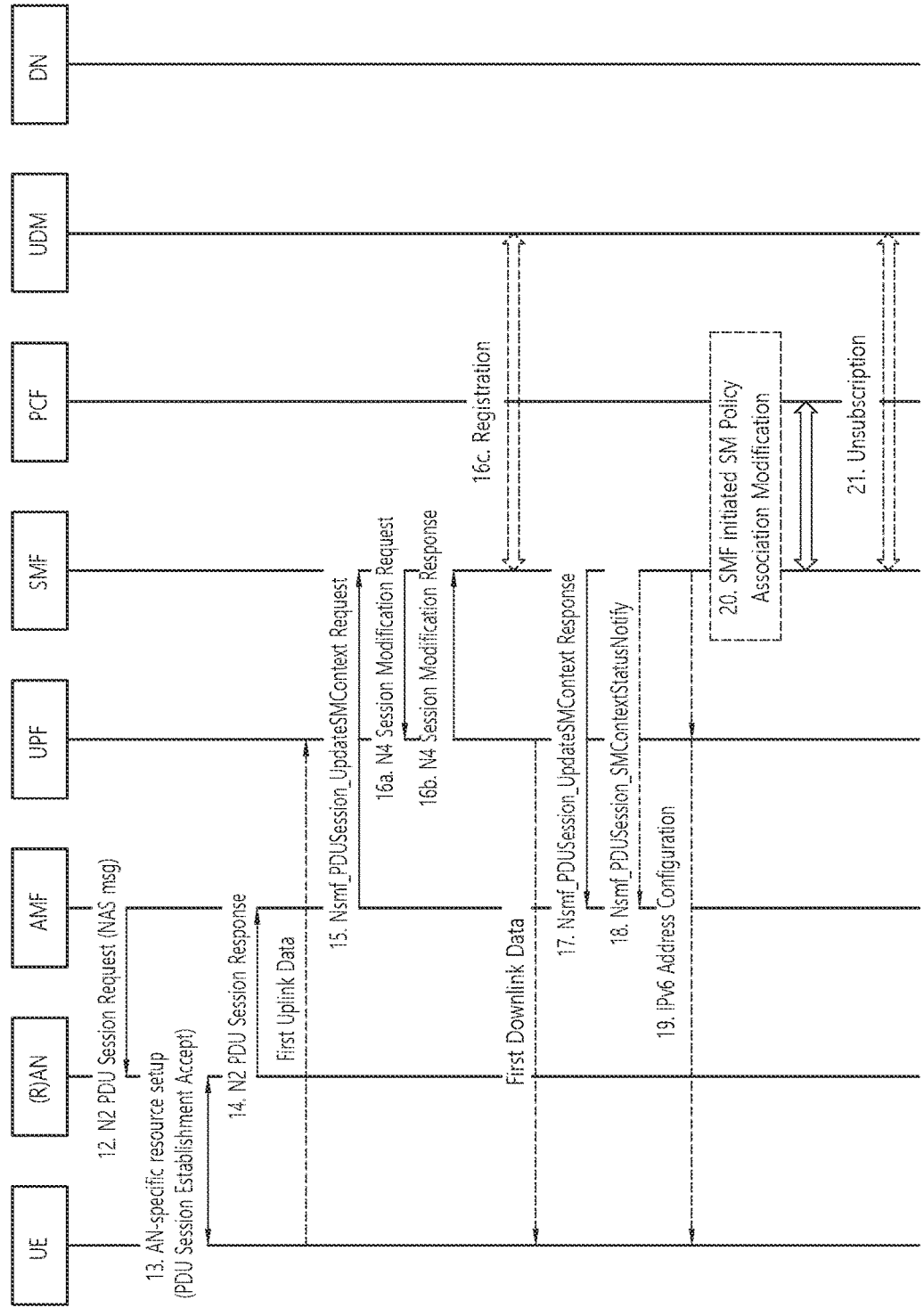

For example, the MA PDU session establishment procedure requested by the UE may be performed in the same manner as in the examples of FIGS. 14A and 14B. The PDU session establishment procedure shown in FIGS. 14A and 14B is similar to the PDU session establishment procedure shown in FIGS. 9A and 9B. Hereinafter, the differentiated parts will be mainly described.

FIGS. 14A and 14B are signal flow diagrams illustrating a PDU session establishment procedure.

For the PDU session establishment procedure shown in the example of FIG. 11, the following description may be applied:

A PDU session establishment request message may be transmitted through 3GPP access or non-3GPP access. In the steps described below, for convenience of description, it is assumed that the PDU session establishment request message is transmitted through 3GPP access.

In step 1), the UE may provide a NAS message (UL NAS Transport message) including the "MA PDU Request" indication, and may provide ATSSS function (eg, "MPTCP function" and/or "ATSSS-LL function") in the MA PDU session establishment request message.

Here, the "MA PDU Request" indication and Request Type="initial request" indicates that this PDU session establishment request may indicate to the network that the ATSSS-LL function or the MPTCP function or both functions are applied to establish a new MA PDU session and to steer the traffic of this MA PDU session.

If the UE requests S-NSSAI and the UE is registered through both accesses, the UE may request S-NSSAI allowed in both accesses.

In step 2), if AMF supports MA PDU session, AMF selects an SMF that supports MA PDU session.

In step 3), the AMF informs the SMF that the request is for the MA PDU session (eg, includes the "MA PDU Request" indication in the request message sent by the AMF to the SMF), and additionally the AMF informs the SMF that whether the UE has been registered through both accesses. If the AMF determines that the UE is registered through both accesses, but the requested S-NSSAI is not allowed in both accesses, the AMF may reject MA PDU session establishment.

In step 4), upon receiving the PDU session establishment request message, the SMF may know that the UE has requested the MA PDU session based on the indication. The SMF may retrieve whether the MA PDU session is allowed through session management subscription data.

In step 7), if the dynamic PCC is used for the MA PDU session, the SMF may transmit the Policy Control Create message including the "MA PDU Request" indication and ATSSS capability information to the PCF. The PCF may determine whether the MA PDU session is allowed or not based on the operator policy and subscription data, and may provide an ATSSS Steering policy.

The PCF may provide a PCC rule (eg, a PCC rule including ATSSS policy control information) for the MA PDU session to the SMF. From the received PCC rule, the SMF may derive (a) an ATSSS rule transmitted to the UE to control traffic steering, switching, and splitting in the uplink direction, and (b) an N4 rule sent to the UPF to control traffic steering, switching, and splitting in the downlink direction. When the UE indicates "ATSSS-LL Capability" support, the SMF may derive Measurement Assistance Information.

If the SMF receives a UP security policy for a PDU session with Integrity Protection set to "Required", and the MA PDU session is established via non-3GPP access, the SMF may not verify whether the access can meet the UP security policy.

The SMF may establish a user-plane resource through the access through which the PDU session request message is transmitted (eg, 3GPP access).

In step 10), the N4 rule for the MA PDU session derived by the SMF may be transmitted to the UPF. In addition, two pieces of N3 UL CN tunnel information may be allocated by SMF or UPF. If the ATSSS capability for the MA PDU session indicates "ATSSS-LL Capability", the SMF may include information for measurement in the N4 rule to indicate that the UPF initiates measurement for this MA PDU session. In step 10a), the UPF may allocate addressing information for the UPF to a Performance Measurement Function (PMF) within the UPF. In step 10b), the UPF may transmit address information for the PMF of the UPF to the SMF.

In step 11, when the SMF allows the establishment of the MA PDU session, the SMF may deliver a PDU session establishment accept message. For example, for the MA PDU session, the SMF may transmit a Namf_Communication_N1N2MessageTransfer message including the "MA PDU session Accepted" indication to the AMF. And, the SMF may inform the AMF that the N2 SM information included in this message should be transmitted through 3GPP access. The AMF may mark this PDU session as an MA PDU session based on the received "MA PDU session Accepted" indication.

In step 13), the UE may receive a PDU Session Establishment Accept message informing the UE that the requested MA PDU session has been successfully established. This message may include ATSSS rules for the MA PDU session derived by the SMF. When the ATSSS function for the MA PDU session indicates "ATSSS-LL function", the SMF may include addressing information of the PMF in the UPF in the measurement support information.

If the SMF is notified in step 2) that the UE is registered through both accesses, after step 18) is performed, the SMF may also initiate establishment of user plane resources through non-3GPP access. The SMF may transmit an N1N2 Message Transfer message including the N2 SM information to the AMF, and inform the AMF that the N2 SM information should be transmitted through non-3GPP access. Since the N1 SM container for the UE was sent to the UE in step 13), the N1N2 Message Transfer message may not include the N1 SM container for the UE. After step 18) is performed, two N3 tunnels between the PSA and the RAN/AN may be established.

The last step above may not be performed if the UE is registered through only one access (when MA PDU session is established with user-plane resources through one access).

Hereinafter, the UE or network requested MA PDU session modification procedure will be described.

Figure 15A:
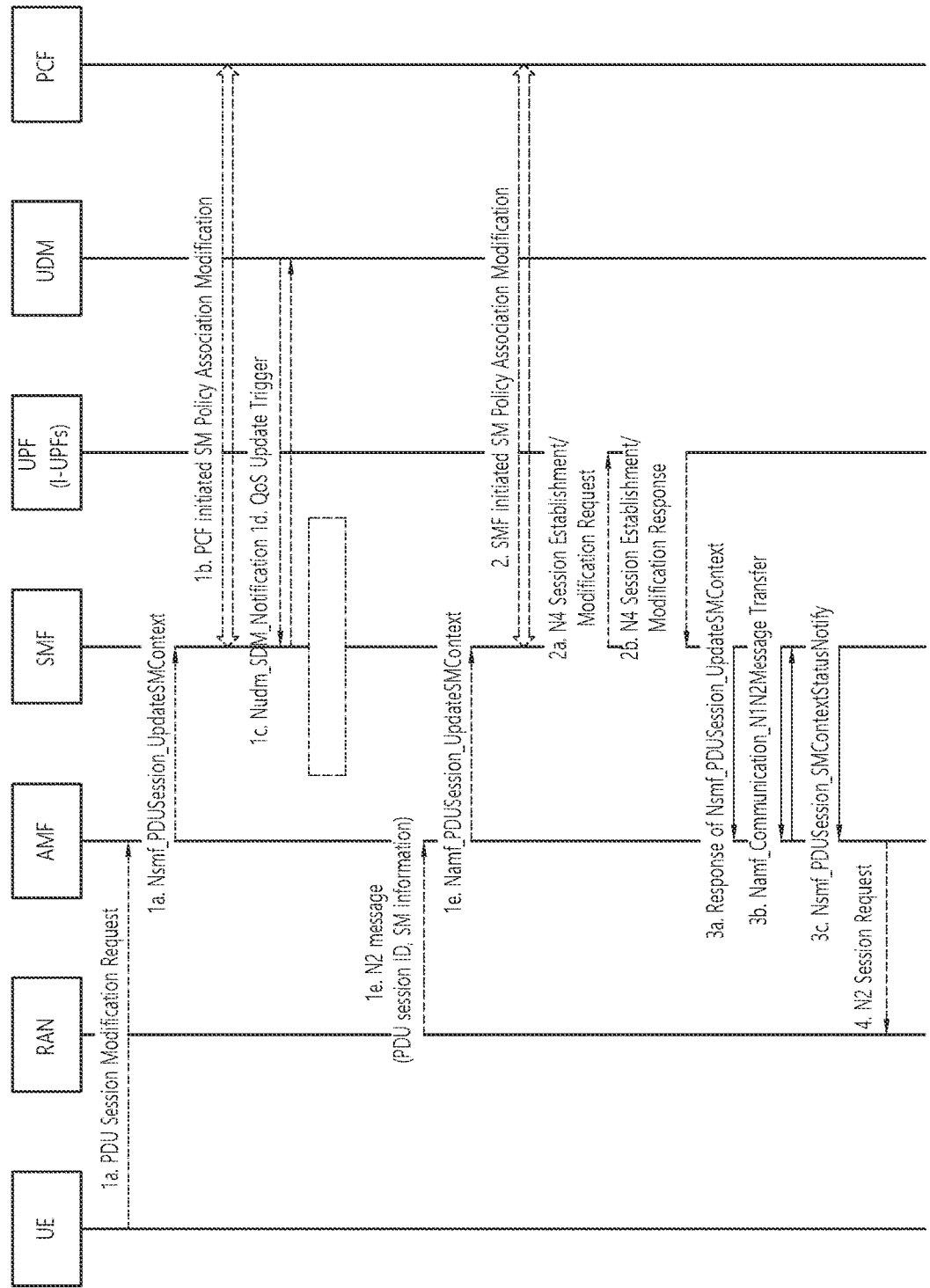
FIGS. 15A and 15B show a PDU session modification procedure.
Figure 15B:
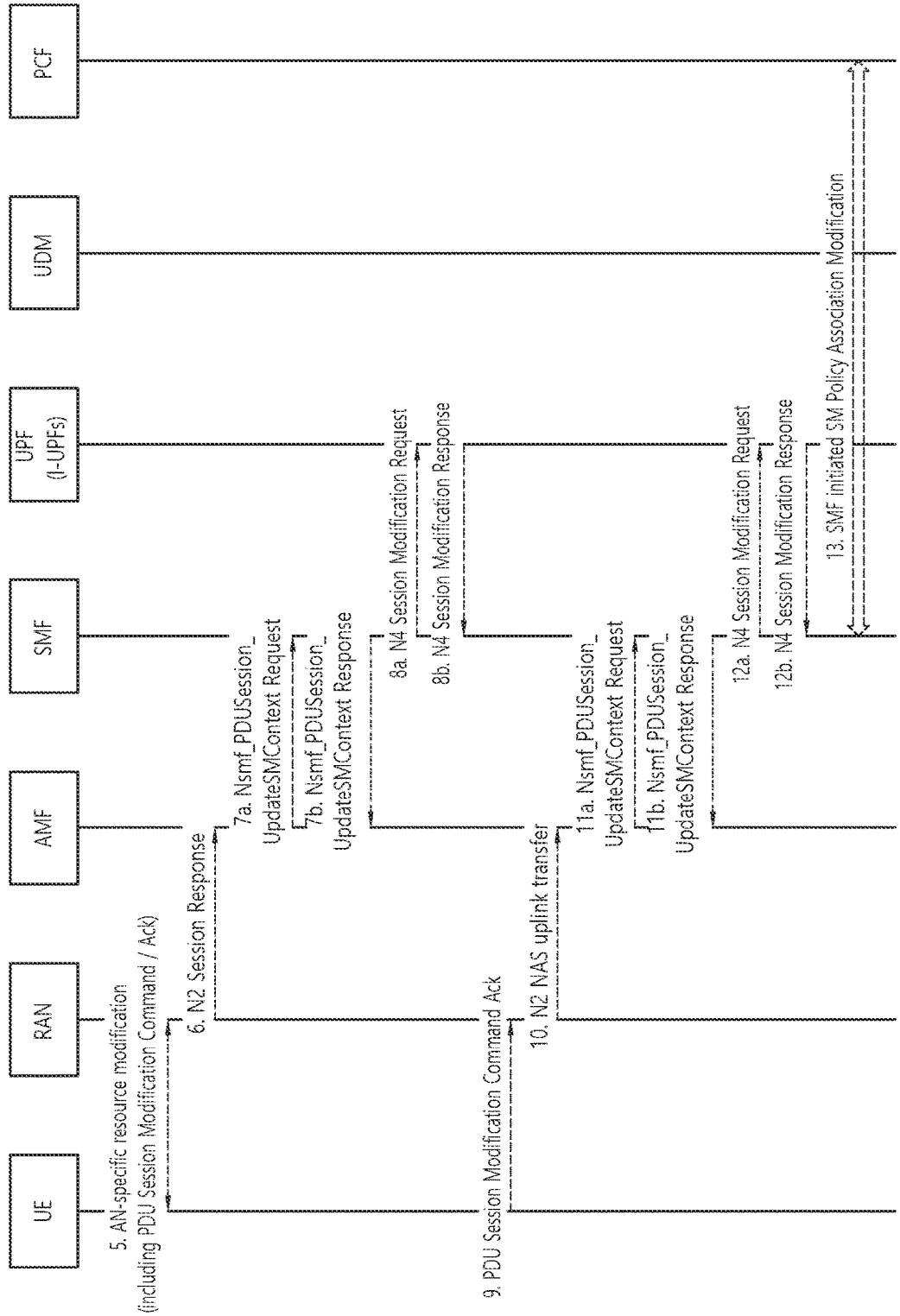

For example, the MA PDU session modification procedure requested by the UE or the network may be performed in the same manner as in the examples of FIGS. 12a and 12b. The PDU session modification procedure shown in FIGS. 15A and 15B is similar to the PDU session modification procedure shown in FIGS. 7a and 7b. Hereinafter, the differentiated parts will be mainly described.

FIGS. 15A and 15B show a PDU session modification procedure.

The PDU session modification procedure of the MA PDU session may be triggered in the following examples:

QoS flow generation/modification (including movement of GBR QoS flows).

Update of ATSSS rules and/or N4 rules

The MA PDU session may be established/managed based on the PDU session modification procedure.

The PDU session modification procedure may be initiated by the UE or may be initiated by the network.

In step 1b), the SMF may receive the updated PCC rule from the PCF. SMF may decide to update ATSSS rules and/or N4 rules based on the updated PCC rules.

In step 1d), when the UPF determines that GBR traffic cannot be transmitted through current ongoing access (eg, determined based on N4 rules and access availability reporting and access non-availability reporting from the UE), the UPF may transmit an access availability report to the SMF. When the SMF receives the access availability report, the SMF may decide to move the GBR QoS flow to another access. If the SMF decides to move the GBR QoS flow, the SMF may trigger this procedure and later move the GBR QoS flow to the target access.

When the SMF decides to move the GBR QoS Flow to another access, in step 3), the SMF may transmit N2 SM information to the target AN. In order for the UE to transmit uplink GBR traffic through the target access, a PDU session modification command message may be transmitted to the UE to update the UE's ATSSS rules. The SMF may release the AN resource of the GBR QoS flow in source access.

In step 3), if the SMF establishes the user plane for the QoS flow, the SMF may provide the AN with a QoS profile as in the following example:

i) In the case of Non-GBR QoS Flow, steps 3) to 8) may be performed for each access for which the user plane resource is activated.

ii) In the case of a GBR QoS Flow allowed in single access, steps 3) to 8) may be performed in allowed access.

iii) In the case of a GBR QoS Flow allowed in both accesses, steps 3) to 8) may be performed in the access according to the decision of the SMF.

In step 3), when the SMF wants to update the ATSSS rule, the SMF may include the updated ATSSS rule in the N1 SM container (including the PDU session modification command). When the SMF provides the N1 SM container and/or N2 SM information, the SMF may include an access type in the Namf_Communication_N1N2MessageTransfer message to provide routing information to the AMF.

In step 8), if the SMF decides to move the GBR QoS Flow to another access, the SMF may send the updated N4 rule to the UPF.

<N4 Session Management>

N4 session management is described.

There are parameters for N4 session management. The SMF can use these parameters to control the function of the UPF. The UPF can use these parameters to notify the SMF of an event occurring in the UPF.

The N4 session management procedure may use related parameters in the same way for all N4 reference points. For example, the N4 session establishment procedure and the N4 session modification procedure may provide control parameters to the UPF. The N4 session release procedure may remove all control parameters related to the N4 session. The N4 Session Level Reporting procedure may inform the SMF about an event related to a PDU session detected by the UPF.

The parameters that the SM provides to the UPF through the N4 reference point may include the N4 session ID and information such as the following example:

Packet Detection Rules (PDR) including information to classify traffic (PDU(s)) arriving at the UPF For the traffic identified by the PDR, Forwarding Action Rules (FAR) including information on whether forwarding, dropping or buffering will be applied Multi-Access Rules (MAR) including information on how to handle traffic steering, switching and segmentation for MA PDU sessions Usage Reporting Rules (URR). Usage reporting rules may include information defining how to account for traffic identified by the PDR and how to report specific measurements. When QoS monitoring is enabled for the traffic identified by the PDR(s), the URR may also include information defining how to measure the packet delay of the traffic and how to report the measurement result.

QoS Enforcement Rules (QER) including information related to QoS enforcement of traffic identified by the PDR(s).

Trace Requirements.

Port Management Information Container of 5GS.

Bridge Information.

N4 Session ID can be allocated by SMF. The N4 session ID may uniquely identify the N4 session.

If the UPF has indicated support for Trace, the SMF may activate the trace session during the N4 session establishment procedure or the N4 session modification procedure. In this case, the SMF may provide trace requirements to the UPF. SMF can use the N4 session modification procedure to disable trace sessions in progress. There can be at most one active trace session per N4 session at a time.

For MA PDU session, for traffic steering in UPF, SMF updates MAR (Multi-Access Rule) by adding FAR ID referring to FAR (Forward Action Rule) including additional access tunnel information for MA PDU session, such that additional access tunnel information can be added during the N4 session modification procedure. For MA PDU sessions, the SMF may request the UPF to report access availability per N4 session.

The N4 session can be used to control both UPF and Network-Side Time-Sensitive Networking (TSN) Translator (NW-TT) operations in UPF. The N4 session may support and activate the exchange of TSN bridge settings between SMF and UPF. The N4 session may use the following information:

information that the SMF needs bridge management;

Information that 5GS transparently relays between AF and NW-TT: Transparent Port Management Information Container.

When the N4 session related to bridge management is established, the UPF may allocate a dedicated port number to the Device-Side TT (DS-TT) side of the PDU session. The UPF may provide the SMF with the following configuration parameters for the N4 session:

NW-TT port number;

DS-TT port number.

After the N4 session is established, the SMF and UPF can exchange transparent bridge port management information containers at any time through the N4 session.

The N4 session context is described. An N4 session context may be identified by an N4 session ID. In order to store parameters related to an N4 session, an N4 session context may be generated by SMF and UPF, respectively. For example, parameters related to an N4 session may include the N4 session ID used for this N4 session, all PDRs, URRs, QERs and FARs or MARs.

Hereinafter, Packet Detection Rule (PDR) will be described.

The PDR may include information for classifying traffic (PDU(s)) arriving at the UPF. Table 4 below is an example of a PDR. All PDRs can be used to detect packets in a specific transmission direction (eg, UL direction or DL direction). An example of the PDR described in Table 4 may indicate attributes in the PDR.

TABLE 4

| Attribute | | Description | Comment |
|---|---|---|---|
| N4 Session ID | | The N4 session associated with this PDR can be identified. (NOTE 5) | |
| Rule ID | | A unique identifier to identify this rule | |
| Precedence | | Determines the order in which the detection information of all rules is applied. | |
| Packet Detection Information. (NOTE 4) | Source interface | includes information such as "access side", "core side", "SME", "N6-LAN", "5G VN (Virtual Network) internal", etc. | A combination of UE IP address (along with network instance if necessary). CN tunnel information, packet filter set, application ID, Ethernet PDU session information, QoS monitoring packet indicator and QFI can be used for traffic detection. The source interface may identify an interface for incoming packets to which the PDR is applied. For example, incoming packets subject to PDR can be either access side (eg uplink), core side (eg downlink), SMF, N6-LAN (eg DN or local DN) or "inside 5G VN" (eg.:can be received from the local switch). |
| | UE IP address | One IPv4 address and or one IPv6 prefix with prefix length (NOTE 3). | |
| | Network instance (NOTE 1) | Identifies the network instance associated with the incoming packet. | |
| | CN tunnel info | It means CN tunnel information for N3 interface and N9 interface. For example, the CN tunnel information may be a Fully qualified-Tunnel Endpoint Identifier (F-TEID). | |
| | Packet Filter Set | It means a set of packet filters. | |
| | Application ID | It means the ID of the application. | |
| | QoS Flow ID | Including values of 5QI or non-standardized QFI. | |
| | Ethernet PDU Session Information | Refers to all (DL) Ethernet packets matching the Ethernet pdu session. | |
| | Framed Route Information | Means Framed Route information. | |
| | QoS Monitoring Packet indicator (NOTE 8) | Identifies packets used for QoS monitoring. | |

TABLE 4-continued

| Attribute | | Description | Comment |
|---|---|---|---|
| Packet replication and detection carry on information (NOTE 6) | Packet replication skip information (NOTE 7) | Includes UE address indication or N19/ N6 indication. If the packet matches packet replication skip information, that is, if the source address of the packet is the UE address or the packet is received at the interface of the packet replication skip information, the UP function does not create a copy of the packet or does not apply the corresponding processing (eg FAR, QER, URR). Otherwise, the UPF performs a copy and applies the corresponding process (eg FAR, QER, URR). | |
| | Carry on indication | It can instruct the UP function to continue the packet detection process, that is, lookup other PDRs without higher precedence. | |
| Outer header removal | | It can instruct the UP function to remove one or more external headers (eg IP + UDP + GTP, IP + possibly UDP, VLAN tags) from the received packet. | An extended header may be stored for this packet. |
| Forwarding Action Rule ID (NOTE 2) | | A Forwarding Action Rule ID may identify a forwarding action to be applied. | |
| Multi-Access Rule ID (NOTE 2) | | Multi-Access Rule ID (Multi-Access Rule ID) identifies the action to be applied to forward processing for MA PDU sessions. | |
| List of Usage Reporting Rule ID(s) | | Every Usage Reporting Rule ID can identify which measurement action needs to be applied. | |
| List of QoS Enforcement Rule ID(s) | | Every QoS Enforcement Rule ID (QoS Enforcement Rule ID) identifies a QoS enforcement action to be applied. | |

In the example of Table 4, NOTE 1 to NOTE 8 mean the following.
NOTE 1:
It may be necessary, for example, in the following cases:
If the UPF supports multiple DNNs with overlapping IP addresses
When the UPF is connected to another UPF or AN node in a different IP domain
For UPF "local switch", N6-based forwarding and N19 forwarding can be used for different 5G LAN groups.
NOTE 2:
Either FAR ID or MAR ID may be included. Not all FAR IDs and MAR IDs are included.
NOTE 3:
The SMF may provide an indication to request that the UPF allocate one IPv4 address and/or an IPv6 prefix. When requesting to provide an IPv6 prefix, the SMF may also provide the IPv6 prefix length.
NOTE 4:
When SMF sends PDR to I-SMF via N16a, Packet Detection Information mat indicate that I-SMF will determine CN tunnel information localy to build N4 PDR. Here, the N4 PDR may be transmitted to the actual UPF controlled by the I-SMF.
NOTE 5:
Rules exchanged between I-SMF and SMF are not associated with N4 session ID but may be associated with N16a association.
NOTE 6:
This may be necessary when supporting broadcast/multicast traffic forwarding using packet replication with SMF-provided PDRs and FARs.
NOTE 7:
To prevent UPF from sending broadcast/multicast packets back to the source UE or source N19/N6, this may be necessary if packet replication using SMF-provided PDR and FAR is performed.
NOTE 8:
The UPF may identify a UL packet or a dummy packet to be a Qos monitoring packet based on the QoS monitoring packet indicator encapsulated in the GTP-U header by the NG-RAN.

Hereinafter, QoS Enforcement Rule (QER) will be described.

QER may define a packet processing method in terms of bit rate limitation and packet marking for QoS purposes. An example of Table 5 below is an example of QER. For reference, all PDRs referencing the same QER may share the same QoS resource (eg, Maximum Flow Bit Rate (MFBR)). Examples of QERs listed in Table 5 may indicate attributes in the QER.

TABLE 5

| Attribute | Description | Comment |
|---|---|---|
| N4 Session ID | Identifies the N4 session associated to this QER | |
| Rule ID | Unique identifier to identify this information. | |
| QoS Enforcement Rule correlation ID (NOTE 1) | The QER correlation ID is an ID that allows the UP function to correlate multiple sessions for the same UE and APN. | QER correlation ID may be used to associate QER for APN-AMBR (Access Point Name-Aggregate Maximum Bit Rate). |

TABLE 5-continued

| Attribute | Description | Comment |
|---|---|---|
| Gate status UL/DL | Gate status UL/DL may instruct the UP function (UPF) to pass or block the flow. | Values that Gate status UL/DL may include are: open, close, close after measurement report (for termination action "discard") |
| Maximum bitrate | Maximum bitrate may be an uplink/downlink maximum bitrate to enforce on the packet. | The Maximum bitrate field may contain one of the following examples: APN-AMBR (for QER referenced by all PDRs involved in all PDN connections to APN) (NOTE 1). Session-AMBR (for QERs referenced by all relevant PDRs of the PDU session). QoS Flow MBR (in case of QER referenced by all PDRs of QoS Flow) SDF MBR (for a QER that is referenced by the uplink/downlink Packet Detection Rule of a SDF) Bearer MBR (for a QER that is referenced by all relevant Packet Detection Rules of a bearer) (NOTE 1). |
| Guaranteed bitrate | It means the uplink/downlink guaranteed bit rate approved for the packet. | The Guaranteed bitrate fieldmay include the following examples: QoS Flow GBR (for a QER that is referenced by all Packet Detection Rules of a QoS Flow) Bearer GBR (for a QER that is referenced by all relevant Packet Detection Rules of a bearer) (NOTE 1). |
| Averaging window | The averaging window may mean a time duration during which the maximum and guaranteed bit rates are calculated. | The averaging window can be used to count packets received over a period of time. |
| Down-link flow level marking | Down-link flow level marking may refer to flow level packet marking in downlink. | In the case of UPF, down-link flow level marking can be used to control the Reflective QoS Indicator (RQI) setting of the encapsulation header. |
| QoS Flow ID | It means QoS Flow ID to be inserted by UPF. | UPF may insert a QFI value in the tunnel header of the outgoing packet. |
| Paging Policy Indicator | Indicates the Paging Policy Indicator (PPI) value required for UPF to insert into outgoing packets. | PPI can only be applied to DL traffic. The UPF may insert the PPI into an outer header of the outgoing PDU. |
| Packet rate (NOTE 1) | It may mean the number of packets per time interval to be enforced. | The Packet rate field may contain one of the following: downlink packet rate for Serving PLMN Rate Control (When the QER is referenced by all PDRs of the UE belonging to a PDN connection using Cellular IoT (CIoT) EPS optimization.) uplink/downlink packet rate for APN Rate Control (When the QER is referenced by all PDRs of the UE belonging to the PDN connection to the same APN using CIoT EPS optimization.). |

In the example of Table 5, NOTE 1 means:
NOTE 1:
This parameter can only be used for interworking with EPC.

Hereinafter, the Multi-Access Rule (MAR) will be described.

MAR may be a rule applied when using ATSSS. The MAR may include information related to a Forwarding Action Rule (FAR) used for each access. For example, when ATSSS is supported, the MAR may include information on association of two FARs for both 3GPP access and non-3GPP access. Table 6 below is an example of MAR. An example of the MAR described in Table 6 may indicate attributes in the PDR.

TABLE 6

| Attribute | Description | Comment |
|---|---|---|
| N4 Session ID | Identifies the N4 session associated to this MAR. | |
| Rule ID | Unique identifier to identify this rule. | |
| Steering functionality | Applicable traffic steering function may be indicated: Steering functionality may | |

TABLE 6-continued

| Attribute | | Description | Comment |
|---|---|---|---|
| Steering mode | | include a value of "MPTCP functionality" and/or "ATSSS-LL functionality". Steering mode may include the values "Active-Standby", "Smallest Delay", "Load Balancing" or "Priority-based". | |
| Per-Access Forwarding Action information (NOTE 1) | Forwarding Action Rule ID | The Forwarding Action Rule ID may identify forwarding action to be applied. | |
| | Weight | If the steering mode is "Load Balancing", the weight for the FAR can be identified. | The sum of weights for all FARs may be 100. |
| | Priority | Priority may include a value "Active or Standby" or "High or Low" for FAR. | "Active or Standby" may mean "Active Standby" steering mode, and "High or Low" may mean "Priority-based" steering mode. |
| | List of Usage Reporting Rule ID(s) | Every Usage Reporting Rule ID can identify which measurement action should be applied. | List of Usage Reporting Rule ID(s) may cause the SMF to request separate usage reports for different FARs (eg. different accesses). |

In the example of Table 6, NOTE 1 may mean the following.
NOTE 1:
Per-Access Forwarding Action information may be provided for each access type (eg, 3GPP access or non-3GPP access).

Hereinafter, a Forwarding Action Rule (FAR) will be described.

FAR may define how to buffer, drop, or forward packets. The FAR may include information related to packet encapsulation and/or packet decapsulation and forwarding destination. Examples of the FAR described in Table 7 may indicate the attributes in the PDR

TABLE 7

| Attribute | Description | Comment |
|---|---|---|
| N4 Session ID | It is possible to identify the N4 session associated with this FAR. | NOTE 9. |
| Rule ID | A unique identifier that identifies this rule. | |
| Action | Identifies the action to be applied to the packet. | May indicate whether a packet is forwarded, duplicated, dropped, or buffered. A number of additional attributes may be included in the FAR if the operation represents forwarding or replication. In the case of a buffering action, the Buffer Action Rule is also included, and the action may also indicate that notification of the first buffered packet and/or notification of the first discarded packet is requested. |
| Network instance (NOTE 2) | A network instance associated with an outgoing packet may be identified (NOTE 1). | NOTE 8. |
| Destination interface (NOTE 3) (NOTE 7) | May include the values "access side", "core side", -SMF "N6-LAN", "5G VN internal" or "5G VN N19". | Access side (i.e. down-link), core side (i.e. up-link), SME, N6-LAN (i.e. the DN or the local DN). 5G VN internal (i.e. local switch), Alternatively, an interface for outgoing packets to 5G VN N19 (i.e. N19 interface) may be identified. |
| Outer header creation (NOTE 3) | Instructs the UP function to add an external header (eg IP + UDP + GTP, VLAN tag), IP + possibly UDP to the outgoing packet. | May include CN tunnel information of a peer entity (eg, NG-RAN, another UPF, SMF. local access to a DN indicated |

TABLE 7-continued

| Attribute | Description | Comment |
|---|---|---|
| | | by DNAI), N6 tunnel information, or AN tunnel information of a peer entity. A stored extension header may be added to this packet. When QoS monitoring is activated for traffic corresponding to PDR(s), a time stamp may be added to the GTP-U header. |
| Send end marker packet(s) (NOTE 2) | Instructs the UPF to construct end marker packet(s) and send them out as described in clause 5.8.1. Instructs the UPF to construct an end marker packet(s) and to transmit it. | This parameter should be sent together with the "outer header creation" parameter of the new CN tunnel info. |
| Transport level marking (NOTE 3) | It may refer to transport level packet marking of uplink and downlink. For example, the DiffServ Code Point can be configured. | NOTE 8. |
| Forwarding policy (NOTE 3) | It may be a reference to a preset traffic steering policy or http redirection (NOTE 4). | It may contain one of the following policies identified by the TSP ID: an N6-LAN steering policy that steers subscriber's traffic to the appropriate N6 service function deployed by the operator; or a local N6 steering policy that enables traffic steering in local access to the DN according to the routing information provided by the AF, or Redirect Destination and value for forwarding action (always, after measurement report (may be done to terminate action "redirect"). |
| Request for Proxying in UPF | It may indicate that the UPF performs ARP proxying and/or IPv6 Neighbor Solicitation Proxying. | It can be applied to Ethernet PDU Session type. |
| Container for header enrichment (NOTE 2) | It may include information used by UPF for header enrichment. | It may be related only to the uplink direction. |
| Buffering Action Rule (NOTE 5) | It may be a reference to the Buffering Action Rule ID that defines the buffering instructions applied by the UPF. (NOTE 6). | |

In the example of Table 6, NOTE 1 to NOTE 9 may mean the following.
NOTE 1:
This may be necessary in cases such as the following examples:
If the UPF supports multiple DNNs with overlapping Ip addresses;
When the UPF is connected to another UPF or NG-RAN node in a different IP domain;
When UPF "local switch" and N19 forwarding are used for different 5G LAN groups;
NOTE 2:
These attributes may be required to set the FAR action to forwarding.
NOTE 3:
These attributes may be required to set the FAR action to forwarding or duplicating.
NOTE 4:
TSP ID may be preset in SMF, and TSP ID may be included in FAR for N6-LAN steering or local N6 steering. TSP ID actions can be executed before Outer header creation actions.
NOTE 5:
This attribute may exist for FAR operation set to buffering.
NOTE 6:
The buffering action rule is generated by the SMF to apply a specific buffering action to the buffering-requested DL packet, and the buffering action rule can be associated with the FAR.
NOTE 7:
The use of "5G VN internal" instructs the UPF to resend packets for another round of ingress processing by using active PDR belonging to another N4 session in the same 5G VN group.
NOTE 8:
FAR can be transmitted from SMF to I-SMF through N16a. A FAR sent by SMF may indicate that the I-SMF must determine the value of this attribute locally in order to build an N4 FAR rule that is sent to the actual UPF (controlled by the I-SMF).
NOTE 9:
Rules exchanged between I-SMF and SMF are not associated with N4 session IDs, but may be associated with N16a associations.

II. Problems to be Solved in the Disclosure of this Specification

In 5G mobile communication, the 3GPP Data Off function may be used. Discussion is ongoing that 3GPP Data Off should be supported even for MA PDU sessions. However, conventionally, when 3GPP Data Off is used for the MA PDU session, a method for supporting efficient communication has not been discussed.

Hereinafter, examples of problems to be solved in the disclosure of the present specification will be described.

For the MA PDU session, there was a discussion on whether to support PS Data Off. The following were discussed: The 3GPP PS Data Off feature can be applied only to the 3GPP access side of the MA PDU session. If 3GPP PS Data Off is activated for a UE with a MA PDU session, uplink traffic and downlink traffic for the MA PDU session through non-3GPP access may continue to follow the intended ATSSS rule.

That is, when the 3GPP PS Data Off function is used for the MA PDU Session, PS Data Off may be applied to 3GPP access and PS Data Off may not be applied to non-3GPP access. However, in this case, there is no discussion on how to enable "applying PS Data Off for 3GPP access and not applying PS Data Off for non-3GPP access".

For example, according to the prior art, when PS Data Off is activated, the following operation may be performed. When PS Data Off is activated, the PCF can block a service for a non-exemption service (ie, a service not included in the exempt service) using the following method.

For example, when PS Data Off is activated, the PCF may update the PCC rule so that data/traffic is discarded except for the exempt service. An example of a specific PCF operation is as follows.

When the PCF knows the activation of 3GPP PS Data Off, the PCF may update the PCC rule so that only packets for services belonging to the list of 3GPP PS Data Off Exempt Services are delivered, and all other packets are discarded.

For example, if the services are controlled by dynamic PCC rules, the PCF may modify the PCC rules to prevent the services from which the SMF and/or UPF do not belong to the list of PS Data Off Exempt Services. As an example, the PCF may modify the PCC rule by setting the gate status to "closed" in all dynamic PCC rules for the downlink direction and the uplink direction (selectively for the uplink direction). Alternatively, the PCF may remove these dynamic PCC rules. As another example, when services are controlled by predefined PCC rules (dynamic PCC rules), the PCF may deactivate these predefined PCC rules. The PCC rule with wild-carded service data flow filters can be one of the PCC rules that is modified, removed, or deactivated. In this case, the PCF may simultaneously install or enable PCC rules for 3GPP PS Data Off Exempt Services.

For example, for one PDU session, four PCC rules (eg, PCC rules A, B, C, D) may be activated. Here, PCC rule A may indicate 3GPP PS Data Off Exempt Service. In this case, if 3GPP PS Data Off is activated, the PCF may modify, or delete/deactivate PCC rules B, C and D. For example, if PCC rules B, C, and D are dynamic PCC rules, PCF modifies PCC rules B, C, and D by closing gates in the downlink direction and in the uplink direction (selectively for the uplink direction) (e.g. by setting the gate status to "closed" within a dynamic PCC rule). For example, if PCC rules B, C and D are predefined PCC rules, the PCF may remove or deactivate PCC rules B, C and D. Since PCC Rule A indicates 3GPP PS Data Off Exempt Service, PCC Rule A does not need to be changed. Assuming a situation in which PCC Rule B contains a wildcard service data flow filter with some 3GPP PS Data Off Exempt Service enabled, to enable downlink traffic and optionally uplink traffic for 3GPP PS Data Off Exempt Service, the PCF may install additional PCC rule E or activate PCC rule E.

According to the above description, the PCF may update the PCC rule. For example, by setting the gate status to "closed" in the PCC rule, the non-PS Data Off Exempted service is prevented (ie, the PCF performs gate control). The PCF may deliver the updated PCC rule to the SMF. The SMF may update the Packet Detection Rule (PDR) based on the updated PCC rule in the N4 Modification procedure. The SMF may perform gate control for a non-PS Data Off Exempted service (eg, a service not included in the PS Data Off Exempt service) based on the updated PDR. This operation may be performed by setting the gate status UL/DL of the QoS Enforcement Rule (QER) belonging to the SMF to the PDR to "close".

In case of MA PDU Session, one QER is included in one PDR. That is, QER can be equally applied regardless of access. In other words, one QER may be equally applied for both 3GPP access and non-3GPP access of the MA PDU session. If the PCF sets the gate status in the PCC rule to "closed" according to the prior art, gate control may be applied to both 3GPP access and non-3GPP access of the MA PDU Session. Then, there is a problem that the non-PS Data Off Exempted service (eg, a service not included in the PS Data Off Exempt service) cannot be serviced through 3GPP access as well as non-3GPP access. Even if communication is performed through non-3GPP access, even though there is no problem such as being charged additionally to the user, there is a problem that a non-PS Data Off Exempted service (eg, a service not included in the PS Data Off Exempt service) cannot be serviced even through non-3GPP access.

Also, according to the prior art, in the case of an Internet Protocol Multimedia Subsystem (IMS) service, PS Data Off may be supported by the IMS itself. For example, the Proxy-Call Session Control Function (P-CSCF), Serving Call Session Control Function (S-CSCF) and/or AS (application server) (eg, IMS AS) included in the IMS network may support PS Data Off for IMS service to a terminal. As IMS itself supports PS Data Off, the PCF does not block IMS service through gate control.

For example, the UE may transmit PS Data Off status (eg, activated) to the S-CSCF through SIP signaling (registration/re-registration). Then, the PS Data Off status transmitted by the terminal may be transmitted to the AS through 3rd party registration. Because 3GPP PS Data Off Exempt Service is configured, the AS may support PS Data Off according to the PS Data Off status. For example, if PS Data Off is activated, AS provides service only for 3GPP PS Data Off Exempt Service, and AS may block services other than 3GPP PS Data Off Exempt Service. Specifically, when PS Data Off is activated, for the terminal, when data related to the IMS service occurs, the AS may provide the service to the terminal only when this data is related to the 3GPP PS Data Off Exempt Service (eg, SIP signaling transmission), if this data is not 3GPP PS Data Off Exempt Service, the AS may block the service.

However, in the case of MA PDU Session, if the UE notifies the PS Data Off status to the AS by IMS signaling, since the AS blocks the 3GPP PS Data Off Exempt Service, there is a problem that the service is blocked even though non-3GPP access can be used. That is, there is a problem that a non-PS Data Off Exempted service (eg, a service not included in the PS Data Off Exempt service) cannot be serviced through 3GPP access as well as non-3GPP access.

Even if communication is performed through non-3GPP access, even though there is no problem such as being charged additionally to the user, there is a problem that a non-PS Data Off Exempted service (eg, a service not included in the PS Data Off Exempt service) cannot be serviced even through non-3GPP access.

III. Disclosure of the Present Specification

The disclosures described below in this specification may be implemented in one or more combinations (eg, a combination including at least one of the contents described below). Each of the drawings shows an embodiment of each disclosure, but the embodiments of the drawings may be implemented in combination with each other.

The description of the method proposed in the disclosure of the present specification may consist of a combination of one or more operations/configurations/steps described below. The following methods described below may be performed or used in combination or complementarily.

For reference, in order for a terminal using the 3GPP system to receive IMS services such as voice call, video call, and SMS (eg, SMS over IP), the terminal must be registered with the IMS network. In addition, the terminal may periodically re-registration to the IMS network.

Such signaling between the terminal and the IMS may be performed through Session Initiation Protocol (SIP) signaling (or IMS signaling) between the IMS layer of the terminal and the core IMS. Here, the IMS layer of the terminal may be a layer included in the application layer of the terminal. Here, the IMS layer of the terminal may be an upper layer with reference to the NAS layer of the terminal. The application layer of the terminal may also be a higher layer with reference to the NAS layer of the terminal. Depending on the implementation of the terminal, the IMS layer of the terminal and the application layer of the terminal may be implemented separately from each other. Alternatively, the IMS layer of the terminal may be included in the application layer of the terminal. For reference, an operation performed by the IMS layer of the terminal may also be performed by the application layer of the terminal. IMS signaling may mean signaling between the IMS layer of the terminal and the IMS network.

The UE may perform the SIP registration procedure through the MA PDU session. In this case, the UE may add an indication (or information) indicating that the service is performed through the MA PDU session (eg, the IMS service is performed through the MA PDU session). For example, when the UE performs the SIP registration procedure through the MA PDU session, the UE may transmit a SIP registration request message including information related to the MA PDU session to the IMS network (eg, P-CSCF, S-CSCF, and/or AS). By transmitting information related to the MA PDU session, the UE can inform that the IMS service is being performed through the MA PDU session. Through this, the P-CSCF, the S-CSCF, and/or the AS may know that the UE has IMS registration through the MA PDU Session.

When the P-CSCF receives the SIP message for the MA PDU Session (downlink), by using a specific value in the Differentiated Services Code Point (DSCP) part of the IP packet that transmits the SIP message, P-CSCF marks whether it is 3GPP PS Data Off Exempt Service or not (eg, whether SIP message is related to 3GPP PS Data Off Exempt Service). Or, if it is not 3GPP PS Data Off Exempt Service (eg SIP message is not related to 3GPP PS Data Off Exempt Service), the P-CSCF may mark a specific value in the DSCP part. Or, depending on two cases (a case in which the SIP message is not related to the 3GPP PS Data Off Exempt Service and a case in which the SIP message is related to the 3GPP PS Data Off Exempt Service), the P-CSCF may mark each different value in the DSCP part. Here, the specific value may be any value that may mean whether or not the 3GPP PS Data Off Exempt Service is performed. Here, "when the P-CSCF receives the SIP message for the MA PDU Session (downlink)" may mean a case in which a SIP message is received for a terminal that has performed SIP registration through the MA PDU session.

In order for the P-CSCF to perform an operation to mark whether the 3GPP PS Data Off Exempt Service, the P-CSCF must know information about 3GPP PS Data Off Exempt Service. The P-CSCF may transmit a request message (eg, an AA-Request message) including information on whether it is 3GPP PS Data Off Exempt Service to the PCF. For example, the P-CSCF may transmit a request message (eg, an AA-Request message) including a DSCP value marked whether 3GPP PS Data Off Exempt Service is available to the PCF. The PCF knows the value marked by P-CSCF, and based on it, based on DSCP marking, depending on whether it is the 3GPP PS Data Off Exempt Service (eg, whether the SIP message is related to 3GPP PS Data Off Exempt Service), the P-CSCF may generate (or update) other PCC rules.

When PS Data Off status (eg PS Data Off status of the terminal) is activated, the PCF may set the Steering Mode differently according to a specific DSCP marking while updating the PCC rule. That is, the PCF can know whether it is the SIP 3GPP PS Data Off Exempt Service (eg, whether the SIP message is related to the 3GPP PS Data Off Exempt Service) according to the DSCP marking received from the P-CSCF, accordingly, the PCF may set the Steering Mode differently. For example, the PCF may enable data belonging to the 3GPP PS Data Off Exempt Service to be transmitted through both 3GPP access and non-3GPP access (in this case, it may not be necessary to change the existing PCC rule). In other words, the PCF may generate (or update) a PCC rule so that this data is transmitted through both 3GPP access and non-3GPP access, when the IMS service-related data (eg, SIP message-related data) to be transmitted to the UE through the MA PDU session belongs to the 3GPP PS Data Off Exempt Service. In addition, the PCF may allow data not belonging to the 3GPP PS Data Off Exempt Service to be transmitted only through non-3GPP access. For example, the PCF generates (or updates) a PCC rule, such that the PCF may allow data not belonging to the 3GPP PS Data Off Exempt Service to be transmitted only with non-3GPP access. For this, the PCF may set the Steering Mode to "Active-Standby", and may set active access to non-3GPP access, and may not set standby access. For example, instead of modifying the gate status to "closed", the PCF may set Steering Mode to "Active-Standby" ("Active-Standby" where non-3GPP access is active access and there is no standby access for downlink direction and uplink direction). Here, the Steering Mode may be included in the PCC rule generated (or updated) by the PCF. Because the PCF sets Active access to "non-3GPP" and does not set Standby access, data related to a service belonging to the non-PS Data Off Exempted service (ie, a service not belonging to the PS Data Off Exempt service) may be delivered only through non-3GPP access. The PCF may transmit the updated (or generated) PCC rule to the SMF. The SMF may update the N4 rule (eg, PDR) according to the prior art based on the updated (or generated) PCC rule. For example, the SMF may newly generate (or update) the ATSSS rule and the N4 rule, if necessary, according to the updated PCC rule. For example, all services belonging to service of the non-PS Data Off Exempt service (eg, services not belonging to the PS Data Off Exempt service) may use Active-Standby mode, as the active access is set as non-3GPP access, the SMF may generate an ATSSS rule and an N4 rule. The SMF may transmit the updated N4 rule to the UPF. The UPF may know how to route downlink traffic for the UE through 3GPP access and non-3GPP access, based on the N4 rule. For example, based on the N4 rule, the UPF may deliver data related to services that do not belong to the list of 3GPP PS Data Off Exempt Services to the UE through non-3PGPP access, and the UPF may deliver data related to services belonging to the list of 3GPP PS Data Off Exempt Services to the UE through 3GPP access and/or non-3GPP access. As an example, according to the updated N4 rule, the UPF may see (or checking) DSCP (DSCP marked by P-CSCF), and the UPF may transmit a service that does not belong to 3GPP PS Data Off Exempt Service to the UE only with non-3GPP access. For example, after receiving the updated N4 rule, the UPF may receive a message (eg, a SIP invite message) including a DSCP value marked with whether it is 3GPP PS Data Off Exempt Service from the P-CSCF. The UPF may determine whether this message relates to a service belonging to the 3GPP PS Data Off Exempt Service, based on the updated N4 rule. If this message relates to a service that does not belong to the 3GPP PS Data Off Exempt Service, the UPF may transmit this message to the UE through non-3GPP access.

DSCP marking for distinguishing 3GPP PS Data Off Exempt Service may be performed by S-CSCF and/or AS. For example, the above-described operation of the P-CSCF may be performed by the S-CSCF and/or the AS. Specifically, when receiving a SIP message for MA PDU Session (downlink), the S-CSCF or AS may mark whether it is the 3GPP PS Data Off Exempt Service (eg, whether the SIP message is related to the 3GPP PS Data Off Exempt Service) in the DSCP part of the IP packet that transmits the SIP message, by using a specific value. In this case, the S-CSCF and/or AS must know information about the 3GPP PS Data Off Exempt Service. Information on 3GPP PS Data Off Exempt Service may be preset in S-CSCF and/or AS. For example, the information on the 3GPP PS Data Off Exempt Service may store information on the 3GPP PS Data Off Exempt Service in advance.

Meanwhile, based on the SIP message, the P-CSCF generates a Media-Component-Description AVP (Attribute-Value Pair) and transmits the AA-Request to the PCF. For example, upon receiving the SIP message, the P-CSCF may generate a Media-Component-Description AVP and transmit an AA-Request message to the PCF. When the P-CSCF transmits the AA-Request message, the P-CSCF may transmit information on whether it belongs to the 3GPP PS Data Off Exempt Service together. For example, the AA-Request message transmitted from the P-CSCF to the PCF may include information on whether the message is a request related to the 3GPP PS Data Off Exempt Service. For example, the P-CSCF may transmit an AA-Request message including a DSCP value marked whether it is 3GPP PS Data Off Exempt Service to the PCF. Based on the AA-Request message transmitted by the P-CSCF, the PCF may determine whether a data flow to be newly generated relates to a service belonging to the Exempt service. Therefore, the P-CSCF may inform the PCF of information on whether the AA-Request message is related to the 3GPP PS Data Off exempt service. The P-CSCF may determine whether or not the 3GPP PS Data Off Exempt Service belongs to the 3GPP PS Data Off Exempt Service based on the information included in the SIP message (eg, whether the SIP message belongs to the 3GPP PS Data Off Exempt Service or whether it is related to the service).

For example, the information included in the SIP message may include information on the message type of the SIP. For example, the information on the message type of the SIP may include information such as REGISTER, INVITE, MESSAGE, and the like. The P-CSCF can know for which service the corresponding SIP message is based on the information included in the SIP message. For example, when the P-CSCF receives a SIP message including information (INVITE) on the message type of the SIP, the P-CSCF can know that the SIP message is a message for a call. When the P-CSCF receives the SIP message including information (MESSAGE) on the message type of the SIP, the P-CSCF may know that the SIP message is a message for Short Message Service (SMS). The Media-Component-Description AVP in the AA-Request may include the Media-Sub-Component AVP. Based on the Flow-Description AVP included in the Media-Sub-Component AVP, the PCF may obtain information on a data flow (eg, IMS data flow for the UE) created through SIP signaling. For example, the Flow-Description AVP may include source IP information, destination IP information, port information, and the like. After the PCF receives the AA-Request, based on this information, the PCF may update the PCC rule. For example, if IMS data flow does not belong to 3GPP PS Data Off Exempt Service, the PCF may update the PCC rule so that this IMS data flow is transmitted only through non-3GPP access. For example, PCF may set Steering Mode to "Active-Standby", set active access to non-3GPP access, and not set standby access.

The SMF may newly generate (or update) the ATSSS rule and the N4 rule, if necessary, according to the updated PCC rule. For example, according to that all services belonging to the non-PS Data Off Exempt service service (eg, services not belonging to the PS Data Off Exempt service) use Active-Standby mode, and Active access is set to non-3GPP access, the SMF may generate an ATSSS rule and an N4 rule.

The SMF may transmit the updated N4 rule to the UPF. Based on the N4 rule, the UPF may know how to route downlink traffic for the UE via 3GPP access and non-3GPP access. For example, based on the N4 rule, the UPF may deliver data related to services that do not belong to the list of 3GPP PS Data Off Exempt Services to the UE through non-3PGPP access, the UPF may deliver data related to a service belonging to the list of 3GPP PS Data Off Exempt Services to the UE through 3GPP access and/or non-3GPP access.

The SMF may deliver the ATSSS rule to the UE. The UE may know how to route uplink traffic through 3GPP access and non-3GPP access based on ATSSS rules. For example, based on the ATSSS rule, the UE may transmit data related to a service that does not belong to the list of 3GPP PS Data Off Exempt Services to the network through non-3PGPP access, the UE may transmit data related to a service belonging to the list of 3GPP PS Data Off Exempt Services to the network through 3GPP access and/or non-3GPP access.

Figure 16:
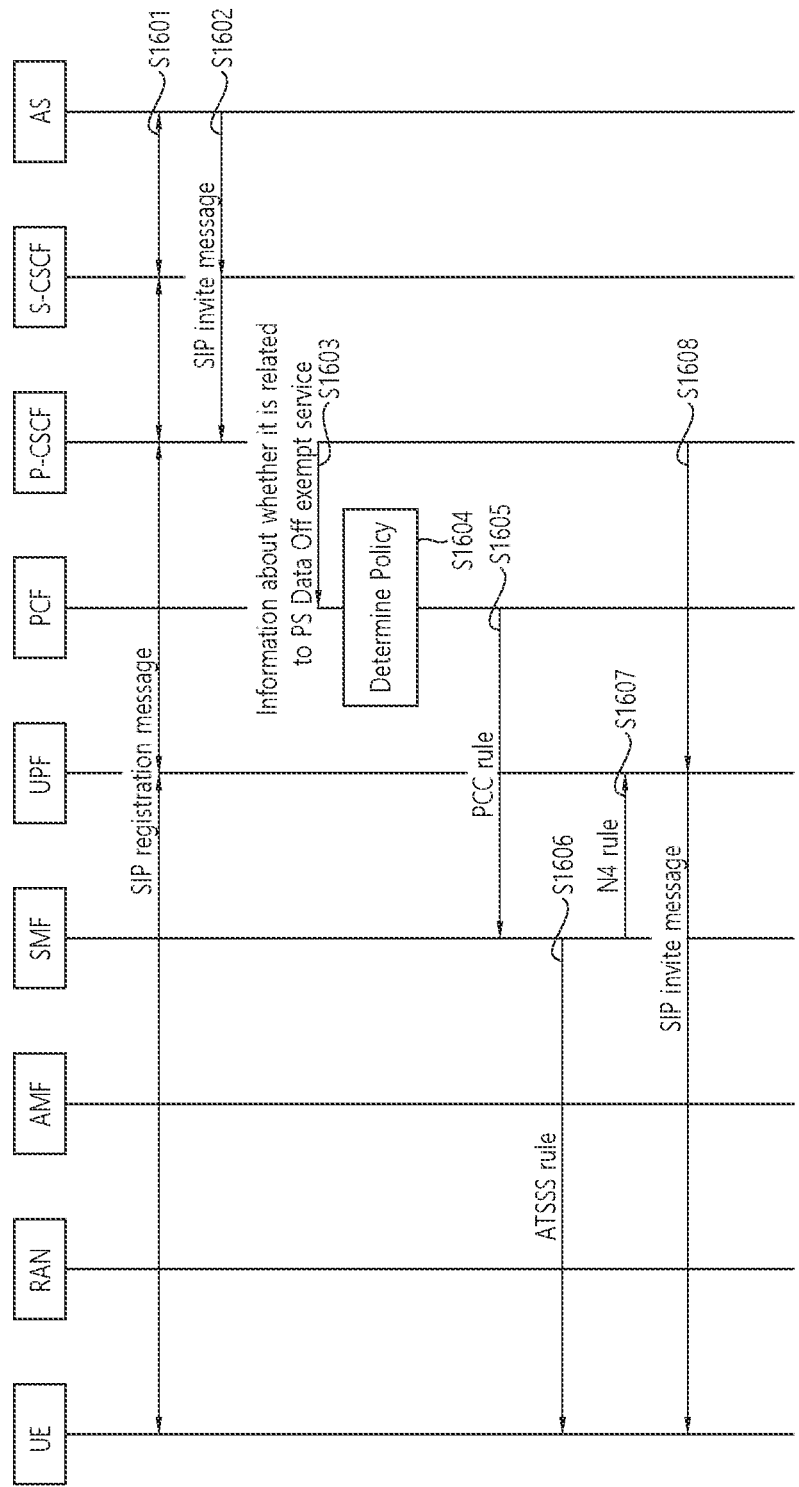
FIG. 16 shows a first example of operations of a network and a terminal according to an embodiment of the disclosure of the present specification.

Hereinafter, a first example of the operation of the network and the terminal according to an embodiment of the disclosure of the present specification will be described with reference to FIG. 16. The operation of FIG. 16 is merely an example, and the operation of the network and the terminal in the present specification is not limited to the operation illustrated in FIG. 16. For example, the operation of the network and the terminal may include the operation described above and/or the operation described below with reference to FIGS. 17 to 18.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 16 shows a first example of operations of a network and a terminal according to an embodiment of the disclosure of the present specification.

Referring to FIG. 16, terminal (eg, UE), RAN, AMF, SMF, UPF, PCF, P-CSCF, S-CSCF, and AS are shown. Here, communication between the terminal and the network nodes (eg, AMF, SMF, UPF, PCF, P-CSCF, S-CSCF, AS) may be performed through the RAN. The P-CSCF, S-CSCF, and AS may be network nodes included in the IMS network.

For reference, the operation performed by the P-CSCF in the example of FIG. 16 may be performed by the S-CSCF or the AS.

In step S1601, the terminal may transmit a SIP registration message. The SIP registration message may include information related to the MA PDU session (eg, information indicating that the service is performed through the MA PDU session (eg, the IMS service is performed through the MA PDU session)). After the SIP registration message is transmitted, the IMS registration procedure may be performed. Since the P-CSCF has received the information related to the MA PDU session, it can be seen that the UE intends to be provided with the IMS service through the MA PDU session.

In step S1602, the AS may transmit a SIP invite message. The AS may transmit a SIP invite message in order to transmit signaling and data related to the IMS service for the MA PDU session of the UE. This may be started by receiving a SIP invite message for the IMS service from another terminal.

In step S1603, the P-CSCF may transmit information on whether the PS Data Off exempt service is related to the PCF. For example, the P-CSCF may determine whether the SIP invite message is related to the PS Data Off exempt service based on that the received information related to the MA PDU session. The P-CSCF may transmit information on whether the SIP invite message is related to the PS Data Off exempt service to the PCF.

In step S1604, the PCF may determine a policy (eg, a PCC rule). Depending on whether the 3GPP PS Data Off Exempt Service, The PCF may generate (or update) other PCC rules. The PCF may update the PCC rule to indicate which access to transmit data through, depending on whether IMS SIP signaling belongs to 3GPP PS Data Off Exempt Service. The PCF may obtain information of data flow through the Flow-Description AVP of the AA Request transmitted by the P-CSCF. The PCF may update the PCC rule indicating through which access the data flow is transmitted, based on the information of the data flow. For example, the PCF may update the PCC rule so that data not belonging to the 3GPP PS Data Off Exempt Service service is transmitted through non-3GPP access. For example, the PCF may update the PCC rule by setting packet detection information. For example, the PCF may set the Steering Mode of the PCC rule to "Active-Standby", set active access to non-3GPP access, and not set standby access.

In step S1605, the PCF may transmit the PCC rule to the SMF. The SMF may newly generate (or modify) the ATSSS rule and the N4 rule, if necessary, according to the updated PCC rule. For example, all services belonging to service of the non-PS Data Off Exempt service (eg, services not belonging to the PS Data Off Exempt service) use Active-Standby mode, as the active access is set as non-3GPP access, the SMF may generate an ATSSS rule and an N4 rule.

In step S1606, the SMF may deliver the ATSSS rule to the UE. The UE may know how to route uplink traffic through 3GPP access and non-3GPP access based on ATSSS rules. For example, based on the ATSSS rule, the UE may transmit data related to services that do not belong to the list of 3GPP PS Data Off Exempt Services to the network through non-3PGPP access, the UE may transmit data related to a service belonging to the list of 3GPP PS Data Off Exempt Services to the network through 3GPP access and/or non-3GPP access.

In Step S1607, the SMF may deliver the N4 rule to the UPF. The UPF may inform how to route downlink traffic for the UE through 3GPP access and non-3GPP access, based on the N4 rule. For example, based on the N4 rule, UPF delivers data related to a service that does not belong to the list of 3GPP PS Data Off Exempt Services to the UE through non-3PGPP access, and delivers data related to a service that belonging to the list of 3GPP PS Data Off Exempt Services Data related to the UE through 3GPP access and/or non-3GPP access.

In step S1608, the P-CSCF may transmit a SIP invite message to the UPF. In this case, the P-CSCF may include whether it is the 3GPP PS Data Off Exempt Service (eg, whether the SIP message is related to the 3GPP PS Data Off Exempt Service) in the SIP invite message. As an example, the P-CSCF may use a specific value in the DSCP part of the IP packet that transmits the SIP message to mark whether the 3GPP PS Data Off Exempt Service (eg, whether the SIP message relates to the 3GPP PS Data Off Exempt Service). The UPF may transmit the SIP invite message to the terminal through 3GPP access or non-3GPP access according to the N4 rule. For example, UPF may transmit data related to a service that does not belong to the 3GPP PS Data Off Exempt Service to the UE only through non-3GPP access.

Hereinafter, a specific example of the operation of the network and the terminal according to an embodiment of the disclosure of the present specification will be described with reference to FIG. 17.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 17:
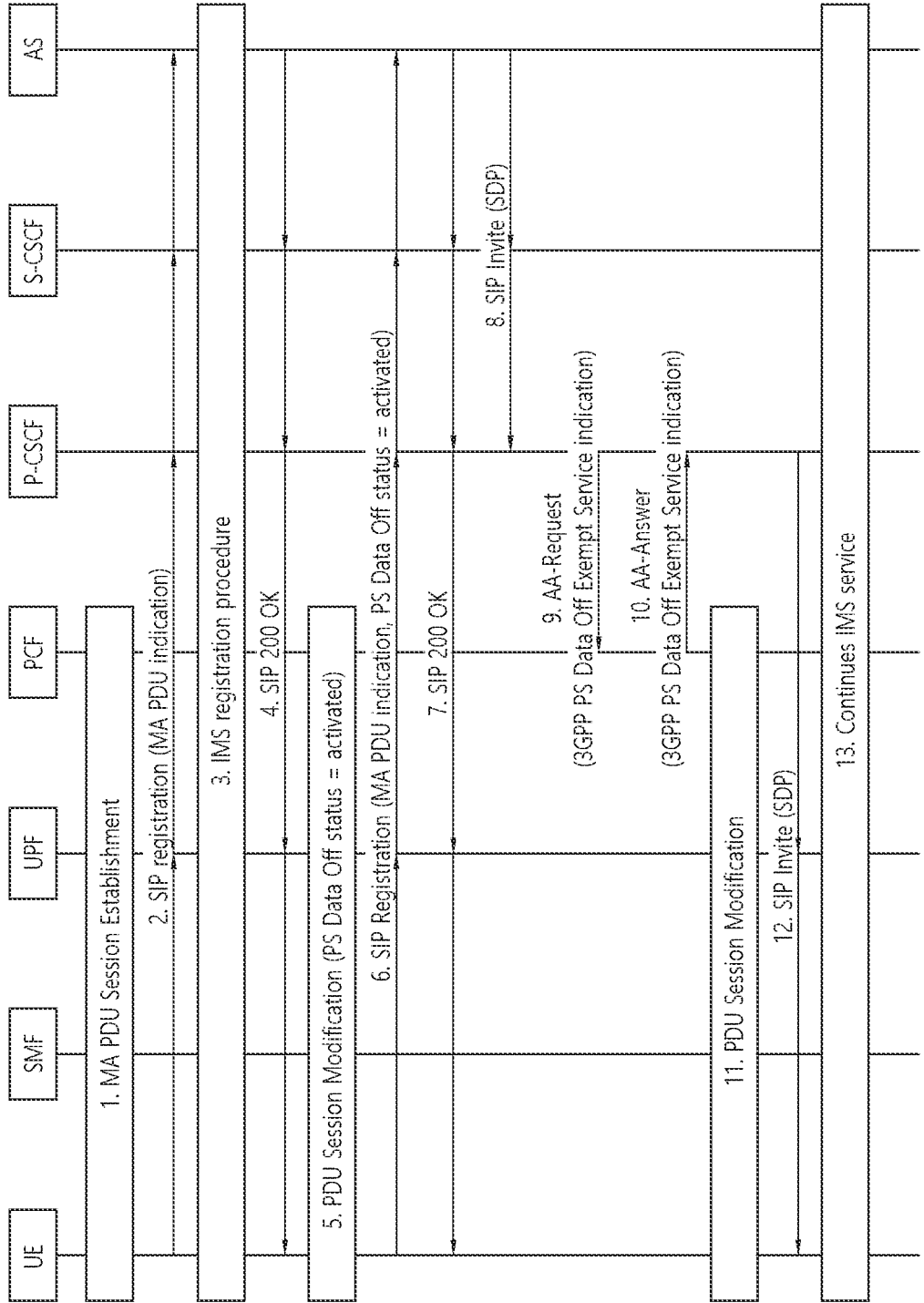
FIG. 17 shows a second example of operations of a network and a terminal according to an embodiment of the disclosure of the present specification.

FIG. 17 shows a second example of operations of a network and a terminal according to an embodiment of the disclosure of the present specification.

A procedure for supporting PS Data Off for IMS service in an MA PDU session will be described with reference to the example of FIG. 17.

1) The UE may establish a MA PDU session. For example, the UE may perform the procedure of establishing the MA PDU session through the PDU session establishment procedure according to the example with reference to FIGS. 9A and 9B or the example with reference to FIGS. 14A and 14B.

2~4) The UE may perform the IMS registration procedure through the MA PDU session. At this time, to the SIP Register message transmitted by the terminal, the terminal may add an indication indicating that the service is performed through the MA PDU Session. For example, in step 2), the terminal may transmit a SIP registration message (including MA PDU session indication) for IMS registration. Here, the MA PDU session indication may mean information (Example: Information indicating that service is performed through MA PDU session (eg, IMS service is performed through MA PDU session)) related to the above-described MA PDU session. After the terminal transmits the SIP registration message, the IMS registration procedure may be performed in step 3). The IMS registration procedure may be performed according to the prior art. If the IMS registration procedure is successfully performed, the AS may transmit a SIP 200 OK message to the terminal.

5) When the user activates the PS Data Off status, while the terminal performs the MA PDU session modification procedure (eg, the MA PDU session modification procedure according to the examples of FIGS. 10A and 10B and FIGS. 15A and 15B), the UE may notify PS Data Off status to the network. To this end, the terminal may transmit a PDU session modification request message to the network. The terminal sets the PS Data Off status in the PCO included in the PDU session modification request message to activated, the terminal may transmit a PDU session modification request message.

Since the terminal has transmitted the PCO including the PS Data Off status set to activated, the PCF can recognize that the PS Data Off status is activated. The PCF recognizing that PS Data Off status is activated, may update PCC rules to inform the SMF through which access to transmit data according to whether the IMS SIP signaling belongs to the 3GPP PS Data Off Exempt Service. For example, the PCF may update the PCC rule so that data not belonging to the 3GPP PS Data Off Exempt Service service is transmitted through non-3GPP access. For example, the PCF may update the PCC rule by setting packet detection information. Specifically, when the PCF sets packet detection information, by setting a TOS (type of service) value and/or a traffic class value included in the packet filter set, data that does not belong to the 3GPP PS Data Off Exempt Service service may be transmitted through non-3GPP access. Here, the PCF may set the TOS value and/or the traffic class value included in the packet filter set according to the DSCP value (DSCP value marked to distinguish whether 3GPP PS Data Off Exempt Service in P-SCSF). The PCF may transmit the updated PCC rule to the SMF. For example, a portion corresponding to a TOS value and/or a traffic class value in a packet filter of a PCC rule generated by the PCF may correspond to a portion marking DSCP in the IP header. For example, based on the TOS value and/or the Traffic class value, the PCF may generate PCC rule by dividing whether the SIP signaling (or data) belongs to a service of the 3GPP PS Data Off Exempt Service or not. For example, for a service belonging to a service of the 3GPP PS Data Off Exempt Service, if DSCP=1 is used, the PCF may set the PCC rule so that the value of the DSCP marking part (eg, the upper 3 bits) in the TOS value and/or the traffic class value becomes 1. This PCC rule may be a rule capable of data transmission through both 3GPP access and non-3GPP access. Here, when DSCP is not 1 (that is, in the case of a service that does not belong to services of the 3GPP PS Data Off Exempt Service), the PCF may generate a PCC rule capable of data transmission through non-3GPP access when the value of the DSCP marking part (eg, upper 3 bits) is not 1. In the PDU session modification procedure, the SMF may update the N4 rule based on the updated PCC rule. The SMF may transmit the updated N4 rule to the UPF.

6~7) While performing IMS re-registration, the terminal may inform that PS Data Off status is activated together with an indication (eg, MA PDU indication) indicating that the service is performed through the MA PDU session (eg, the IMS service is performed through the MA PDU session). Here, IMS re-registration may be started to notify a change (eg, activation or deactivation) of PS Data Off status. For example, the terminal may transmit a SIP registration message including information indicating that the MA PDU indication and PS Data Off status are activated to the network. And, the terminal may receive the SIP 200 OK message.

For reference, steps 6) and 7) may not be performed as needed. As an example, steps 6) and 7) may not be performed according to the needs of the P-CSCF. For example, if the P-CSCF is always performing DSCP marking regardless of whether the PS Data Off status is activated, steps 6) and 7) may not be performed. If this process does not exist (that is, if step 6) and step 7) are not performed), after the P-CSCF receives the IMS message (eg, SIP invite message) in step 8) to be described later, in step 9), the operation of indicating whether it belongs to the 3GPP PS Data Off Exempt Service through the AA-Request message, and the operation of the P-CSCF marking the DSCP in step 12) may always be performed regardless of the PS Data Off status. This is because if steps 6) and 7) are not performed, the P-CSCF, the S-CSCF and/or the AS cannot know whether the PS Data Off status is activated or deactivated. Here, the operation of marking the DSCP may be performed by the P-CSCF, the S-CSCF, or the AS. On the other hand, when steps 6) and 7) are performed, only when the Data Off status is activated, in step 9), the operation of notifying whether it belongs to the 3GPP PS Data Off Exempt Service through the AA-Request message, and in step 12) an operation for marking the DSCP by the P-CSCF may be performed. Also, when this process (eg, step 6) and step 7)) is performed, steps 2) to 5) may not be performed.

When receiving an indication (eg, MA PDU indication) to perform IMS service through the MA PDU Session, even if the PS Data Off status is activated, the AS should not block the service to the terminal. In order not to give the impact to AS (for example, in order not to change the operation of the AS from the conventional operation), the UE may transmit a SIP Registration message including only the MA PDU Session indication while omitting the transmission of the activation report for the PS Data Off status. Here, "in order not to give an impact of AS" is described in more detail as follows. According to the prior art, when the PS Data Off status is activated, the AS does not transmit SIP signaling itself to the terminal in order to block the service. However, in the present specification, the AS does not perform blocking, and allows the UPF to transmit data of a service belonging to the 3GPP PS Data Off Exempt Service to non-3GPP access. Therefore, the AS should not block signaling even when PS Data Off is activated for the MA PDU session. If the terminal does not transmit an activation report for the PS Data Off status, the AS does not know the activation of the PS Data Off status of the terminal, so it can transmit signaling as it is according to the prior art. For example, in this case, even if the user activates the Data Off status, the terminal may not transmit the PS Data Off status to the network through IMS signaling (eg, SIP registration message transmission).

8) Signaling for IMS service may be started in AS. The AS may transmit SIP signaling (eg, a SIP invite message including Session Description Protocol (SDP)) to the P-CSCF. P-CSCF according to the pre-configured 3GPP PS Data Off Exempt Service information, based on SIP information (eg, information included in SIP signaling), the P-CSCF may determine whether it is related to 3GPP PS Data Off Exempt Service. For example, based on SIP information (eg, information included in SIP signaling), The P-CSCF may determine whether it belongs to the 3GPP PS Data Off Exempt Service (eg, whether SIP signaling is related to a service belonging to the 3GPP PS Data Off Exempt Service). For reference, the S-CSCF or the AS may perform an operation of determining whether it is related to the 3GPP PS Data Off Exempt Service.

9-10) The P-CSCF may inform whether it belongs to the 3GPP PS Data Off Exempt Service (eg, 3GPP PS Data Off Service indication) while transmitting the AA-Request to the PCF. For example, the P-CSCF may transmit an AA-Request message including information on whether it is related to 3GPP PS Data Off Exempt Service to the PCF. The PCF may transmit an AA-Answer message to the P-CSCF. The PCF may include the 3GPP PS Data Off Service indication in the AA-Answer message for confirmation.

On the other hand, when the S-CSCF or AS performs DSCP marking, the P-CSCF may recognize whether it belongs to the 3GPP PS Data Off Exempt Service based on the DSCP value of the SIP message received from the S-CSCF or the AS. Then, the P-CSCF may inform whether it belongs to the 3GPP PS Data Off Exempt Service while transmitting the AA-Request to the PCF.

11) If the IMS service does not belong to the 3GPP PS Data Off Exempt Service, the PCF may update the PCC rule as necessary. For example, if the IMS service related to the SIP invite message received in step 8) does not belong to the 3GPP PS Data Off Exempt Service, the PCF may update the PCC rule. In this case, the data of the IMS service that does not belong to the 3GPP PS Data Off Exempt Service is not provided through 3GPP access, the PCF may update the PCC rule to be provided through non-3GPP access. For example, the PCF may set the Steering Mode of the PCC rule to Active-Standby so that the data of the corresponding IMS service is not serviced with 3GPP access, the PCF may set active access to non-3GPP access in Active-Standby and not set standby access. The PCF may transmit the updated PCC rule to the SMF. The updated PCC rule is transmitted to the SMF, and the SMF may update the ATSSS rule and the N4 rule according to the updated PCC rule.

The operations described in step 11) may be performed when the PCF initiates a PDU session modification procedure. For example, according to step 1b) of the PDU session modification procedure described above with reference to FIGS. 10A and 10B and FIGS. 15A and 15B, in order for the PCF to transmit the updated PCC rule, a PDU session modification procedure may be performed. The PCF may transmit the PCC rule to the SMF. Then, the SMF may update the ATSSS rule and the N4 rule based on the updated PCC rule. The SMF may transmit the Namf_Communication_N1N2Message Transfer message including the updated ATSSS rule (eg, see step 3b of FIG. 15A or step 3b of FIG. JOB) to the AMF, and the AMF may transmit the updated ATSSS rule to the UE. For example, the AMF may transmit a PDU session command message including the updated ATSSS rule to the UE. The SMF may transmit an N4 session modification request message including the updated N4 rule (eg, see step 8a) or step 12a) of FIG. 15B or step 8a) or step 12a) of FIG. 10B) to the UPF.

12) The P-CSCF may indicate whether it belongs to the 3GPP PS Data Off Exempt Service through DSCP marking while transmitting the SIP message. For example, by marking a specific value in the DSCP portion of an IP packet of a SIP message, the P-CSCF may indicate whether it is related to the 3GPP PS Data Off Exempt Service (eg, whether the SIP message is related to the 3GPP PS Data Off Exempt Service). The P-CSCF may transmit a SIP invite message including the marked DSCP value to the UPF. The UPF may determine which access to transmit the SIP invite message according to the N4 rule set in step 5) or the N4 rule set in step 11). For example, according to the DSCP marking value (eg DSCP value marked that it does not belong to 3GPP PS Data Off Exempt Service), the UPF may transmit a SIP message related to a service not belonging to the 3GPP PS Data Off Exempt Service to the UE only through non-3GPP access. The operation of performing DSCP marking on the SIP message may be performed by the S-CSCF or the AS. If the S-CSCF or AS, not the P-CSCF, performs DSCP marking, S-CSCF or AS must know information about 3GPP PS Data Off Exempt Service.

Step 12) may be performed simultaneously with step 11). Before the updated ATSSS rule is transmitted to the terminal (For example, in the example described in step 11), before the operation of the SMF transmitting the ATSSS rule to the terminal is performed), in order to prevent the service from starting, the terminal may be configured to use the IMS precondition. To this end, the terminal may be configured to use the IMS precondition by using the precondition disabling policy. Here, the precondition disabling policy may indicate whether the terminal can use the precondition mechanism. When the terminal uses the IMS precondition, the terminal does not transmit a response to IMS signaling until QoS for the IMS service is set up. That is, while step 11) is performed, after receiving the PDU session modification command message and the updated ATSSS rule included in the PDU session modification command message, the UE transmits a response to IMS signaling. Therefore, if the IMS precondition is used, it is possible to prevent the IMS service from starting before the ATSSS rule is updated.

13) After step 12) is performed, the IMS service may be started. Data may be transmitted according to the PCC rule set (or updated) in step 11). For example, since PS Data Off status is activated, data related to a service not belonging to the 3GPP PS Data Off Exempt Service may be transmitted to the terminal through non-3GPP access.

Hereinafter, an example of an operation performed by a network node (eg, P-CSCF, S-CSCF, or AS) will be described with reference to FIG. 18.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 18:
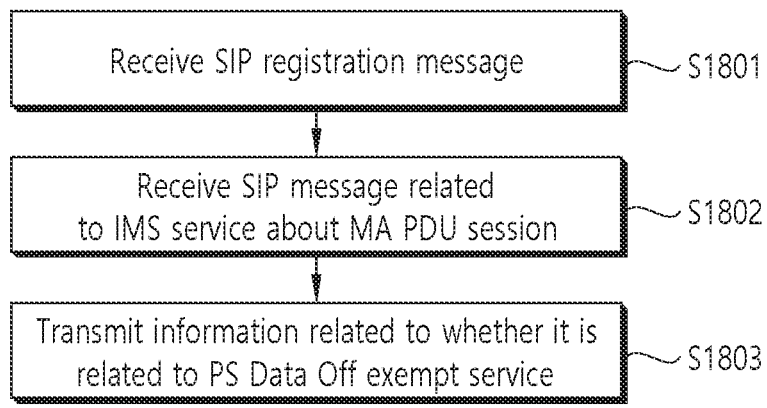
FIG. 18 shows an example of operation of a network according to an embodiment of the disclosure of the present specification.

FIG. 18 shows an example of operation of a network according to an embodiment of the disclosure of the present specification.

In step S1801, the network node may receive the SIP registration message. The SIP registration message may include MA PDU session information. The MA PDU session information may include information indicating that the UE performs an IMS service through the MA PDU session.

For reference, the network node may receive a SIP registration message including information that PS Data Off status is activated from the terminal. Through this, the network can recognize that the PS Data Off status is activated.

In step S1802, the network node may receive a SIP message related to the IMS service for the MA PDU session. For example, the network node may receive a SIP message for providing an IMS service for the MA PDU session of the terminal.

According to the preconfigured 3GPP PS Data Off Exempt Service information, based on SIP information (eg, information included in SIP signaling), the network node may determine whether 3GPP PS Data Off Exempt Service exists. For example, based on SIP information (eg, information included in SIP signaling), the network node may determine whether it belongs to the 3GPP PS Data Off Exempt Service (eg, whether SIP signaling relates to a service belonging to the 3GPP PS Data Off Exempt Service).

In step S1803, the network node may transmit information on whether or not it is related to the PS Data Off exempt service. For example, the network node may transmit an AA-Request message including information on whether 3GPP PS Data Off Exempt Service is related or not to the PCF. The network node may indicate whether it belongs to the 3GPP PS Data Off Exempt Service through DSCP marking while transmitting the SIP message. For example, a network node may mark a specific value in the DSCP portion of an IP packet of a SIP message, such that the network node may indicate whether it is related to whether the 3GPP PS Data Off Exempt Service (eg, whether the SIP message is related to the 3GPP PS Data Off Exempt Service). The network node may transmit a SIP invite message including the marked DSCP value to the UPF.

As described in the disclosure of the present specification, PS Data Off can be efficiently supported for IMS service through the MA PDU session. For example, even if the UE activates PS Data Off by applying PS Data Off to the IMS service through the MA PDU session, data related to the service that does not belong to the PS Data Off exempt service will be transmitted through non-3GPP access. Through this, service continuity can be guaranteed.

As described in the disclosure of this specification, the terminal may inform the network that the IMS service is performed through the MA PDU Session through IMS signaling. The P-CSCF may indicate whether it belongs to the 3GPP PS Data Off Exempt Service (eg, whether the SIP message relates to the 3GPP PS Data Off Exempt Service) through DSCP marking. The P-CSCF checks the SIP signaling and sends the AA-Request by including information on whether it belongs to the 3GPP PS Data Off Exempt Service (eg, whether the SIP message is related to the 3GPP PS Data Off Exempt Service) in the AA-Request. Based on the information included in the AA-request, the PCF may update the PCC rule so that data related to a service not belonging to the 3GPP PS Data Off Exempt Service is transmitted through non-3GPP access. For example, the PCF may set the Steering Mode of the corresponding service to Active-Standby, and may set the active access to non-3GPP access and may not set standby access.

For reference, the operation of the terminal (eg, UE) described in this specification may be implemented by the apparatus of FIGS. 1 to 3 to be described below. For example, the terminal (eg, UE) may be the first device 100 or the second device 200 of FIG. 1. For example, an operation of a terminal (eg, UE) described herein may be processed by one or more processors 102 or 202. The operation of the terminal described in this specification may be stored in one or more memories 104 or 204 in the form of an instruction/program (e.g. instruction, executable code) executable by one or more processors 102 or 202. One or more processors 102 or 202 control one or more memories 104 or 204 and one or more transceivers 106 or 206, and execute instructions/programs stored in one or more memories 104 or 204 as disclosed herein, thereby perform the operation of the terminal (eg, UE) described in the disclosure of the present specification.

In addition, instructions for performing an operation of a terminal (eg, a UE) described in the disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operation of the terminal (eg, a UE) described in the disclosure of the present specification.

For reference, the operation of a network node (eg, AMF, SMF, UPF, PCF, P-CSCF, S-CSCF, AS etc.) or a base station (eg, NG-RAN, gNB, gNB (NB-IoT), gNB (NR) eNB, RAN, etc.) described in this specification will be may be implemented by the apparatus described below in FIG. 16 to 20. For example, the network node (eg, AMF, SMF, UPF, PCF, P-CSCF, S-CSCF, AS etc.) or a base station (eg, NG-RAN, gNB, gNB (NB-IoT), gNB (NR) eNB, RAN, etc.) may be the first device 100 or the second device 200 of FIG. 1. For example, the operation of the network node (eg, AMF, SMF, UPF, PCF, P-CSCF, S-CSCF, AS etc) described herein may be processed by one or more processors 102 or 202. The operations of the network node or base station described herein may be stored in one or more memories 104 or 204 in the form of instructions/programs (e.g. instruction, executable code) executable by one or more processors 102 or 202. One or more processors 102 or 202 control one or more memories 104 or 204 and one or more transceivers 106 or 206, and may perform the operation of the network node (eg, AMF, SMF, UPF, PCF, P-CSCF, S-CSCF, AS etc.) or the base station (eg, NG-RAN, gNB, gNB (NB-IoT), gNB (NR) eNB, RAN, etc.) described in the disclosure of the present specification by executing instructions/programs stored in one or more memories 104 or 204 as disclosed herein.

In addition, the instructions for performing the operation of the network nodes described in the disclosure of this specification (eg, AMF, SMF, UPF, PCF, P-CSCF, S-CSCF, AS etc.) or a base station (eg, NG-RAN, gNB, gNB (NB-IoT), gNB (NR) eNB, RAN, etc.) may be stored in a non-volatile computer-readable storage medium recording. The storage medium may be included in one or more memories 104 or 204. And, the instructions recorded in the storage medium are executed by one or more processors 102 or 202 to perform operations of the network node (eg, AMF, SMF, UPF, PCF, P-CSCF, S-CSCF, AS etc.) or base station (eg, NG-RAN, gNB, gNB (NB-IoT), gNB (NR) eNB, RAN, etc.) described in the disclosure of the present specification.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method for performing communication related to a Multi Access (MA) Packet Data Unit (PDU) session, the method performed by a network node and comprising:
    receiving a Session Initiation Protocol (SIP) registration message including MA PDU session information from a User Equipment (UE),
    wherein the MA PDU session information includes first information that the UE performs an Internet Protocol Multimedia Subsystem (IMS) service through the MA PDU session, which is established via both of 3rd generation partnership project (3GPP) access and non-3GPP access;
    transmitting the SIP registration message to an Application Server (AS);
    performing IMS registration procedure for the MA PDU session;
    receiving a SIP invite message related to the IMS service for the MA PDU session from the AS; and
    based on the received MA PDU session information, transmitting second information on whether the IMS service for the SIP invite message is included in Packet Data (PS) Data Off exempt service to a Policy Control Function (PCF) node,
    wherein the second information enables the PCF node to update a Policy and Charging Control (PCC) rule,
    wherein the updated PCC rule includes a steering mode of the PCC rule for the IMS service being configured to Active Standby based on active access being non-3GPP access and standby access being not configured, based on that the IMS service is not included in the PS Data Off exempt service, and
    wherein the 3GPP PS Data Off prevents traffic via the 3GPP access except for traffic related to the 3GPP PS Data Off Exempt service, when the 3GPP PS Data Off is activated.

2. The method of claim 1, further comprising:
    determining whether the SIP invite message is related to a service included in the PS Data Off exempt service based on the preset information on the PS Data Off exempt service.

3. The method of claim 1,
    when the information on whether the SIP invite message is related to the PS Data Off exempt service indicates that the SIP invite message is not related to the PS Data Off exempt service, data not related to the PS Data Off exempt service is transmitted only through non-3GPP access and the PCF node updates the PCC rules to be forwarded.

4. The method of claim 1, further comprising:
    transmitting an IP packet for transmitting the SIP message to a User Plane Function (UPF) node, by including a Differentiated Service Code Point (DSCP) value related to second information.

5. The method of claim 4,
    when the DSCP value indicates that the SIP invite message is not related to the PS Data Off exception service, the DSCP value is used for the UPF to transmit data not related to the PS Data Off exception service only through non-3GPP access.

6. The method of claim 1, further comprising:
    receiving third information that PS Data Off status is activated from the UE.

7. The method of claim 6,
    wherein the second information is transmitted, based on that both of the third information and the MA PDU session information are received.

8. A method for performing communication related to a Multi Access (MA) Packet Data Unit (PDU) session, the method performed by a User Equipment (UE) and comprising:
    transmitting a Session Initiation Protocol (SIP) registration message including MA PDU session information to a network node of an Internet Protocol Multimedia Subsystem (IMS) network, to perform an IMS service through the MA PDU session,
    wherein the MA PDU session information includes first information indicating that an IMS service is performed through the MA PDU session;
    performing IMS registration procedure for the MA PDU session; and
    transmitting information that Packet Switch (PS) Data Off status is activated to the network node of the IMS network,
    wherein the MA PDU session information is used for the network node of the IMS network to generate second information on whether the IMS service for a SIP invite message is included in the PS Data Off exempt service,
    wherein the second information enables a Policy Control Function (PCF) node to update a Policy and Charging Control (PCC) rule,
    wherein the updated PCC rule includes a steering mode of the PCC rule for the IMS service being configured to Active Standby based on active access being non-3GPP access and standby access being not configured, based on that the IMS service is not included in the PS Data Off exempt service, and
    wherein the 3GPP PS Data Off prevents traffic via the 3GPP access except for traffic related to the 3GPP PS Data Off Exempt service, when the 3GPP PS Data Off is activated.

9. A network node configured to perform communication related to a Multi Access (MA) Packet Data Unit (PDU) session, the network node comprising:
    at least one processor; and
    at least one memory operably electrically connectable with the at least one processor and storing instructions that, when executed by the at least one processor, perform operations that include:
    receiving a Session Initiation Protocol (SIP) registration message including MA PDU session information from a User Equipment (UE),
    wherein the MA PDU session information includes first information that the UE performs an Internet Protocol Multimedia Subsystem (IMS) service through the MA PDU session established via both of 3rd generation partnership project (3GPP) access and non-3GPP access;

transmitting the SIP registration message to an Application Server (AS);

performing IMS registration procedure for the MA PDU session;

receiving a SIP invite message related to the IMS service for the MA PDU session from the AS; and based on the received MA PDU session information, transmitting second information on whether the IMS service for the SIP invite message is included in Packet Data (PS) Data Off exempt service to a Policy Control Function (PCF) node, wherein the second information enables the PCF node to update a Policy and Charging Control (PCC) rule, wherein the updated PCC rule includes a steering mode of the PCC rule for the IMS service being configured to Active Standby based on active access being non-3GPP access and standby access being not configured, based on that the IMS service is not included in the PS Data Off exempt service, and wherein the 3GPP PS Data Off prevents traffic via the 3GPP access except for traffic related to the 3GPP PS Data Off Exempt service, when the 3GPP PS Data Off is activated.

* * * * *